(12) United States Patent
Swett

(10) Patent No.: US 10,054,707 B2
(45) Date of Patent: Aug. 21, 2018

(54) BIPOLAR ACOUSTIC HYPERLENS FOR DUAL-STRING THRU-CASING ULTRASONIC SENSORS

(71) Applicant: BAKER HUGHES INCORPORATED, Houston, TX (US)

(72) Inventor: Dwight W. Swett, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 309 days.

(21) Appl. No.: 15/130,312

(22) Filed: Apr. 15, 2016

(65) Prior Publication Data

US 2017/0299752 A1 Oct. 19, 2017

(51) Int. Cl.
- *G01V 1/46* (2006.01)
- *G10K 11/30* (2006.01)
- *E21B 47/00* (2012.01)
- *G01V 1/52* (2006.01)

(52) U.S. Cl.
CPC ............ *G01V 1/46* (2013.01); *E21B 47/0005* (2013.01); *G01V 1/52* (2013.01); *G10K 11/30* (2013.01)

(58) Field of Classification Search
CPC . G01V 1/46; G01V 1/52; G10K 11/30; E21B 47/0005
See application file for complete search history.

(56) References Cited

U.S. PATENT DOCUMENTS

| | | | |
|---|---|---|---|
| 5,495,174 A | 2/1996 | Rao et al. | |
| 9,084,057 B2 * | 7/2015 | Turqueti | H04R 1/326 |
| 9,581,715 B1 * | 2/2017 | Swett | G01V 1/44 |
| 2005/0096847 A1 | 5/2005 | Huang | |
| 2009/0043206 A1 * | 2/2009 | Towfiq | A61B 8/0825 600/447 |

(Continued)

FOREIGN PATENT DOCUMENTS

| | | |
|---|---|---|
| WO | 96-21871 A1 | 7/1996 |
| WO | 2013089683 A1 | 6/2013 |

OTHER PUBLICATIONS

ISR in PCT/US2014/062585 dated Feb. 13, 2015.
IPRP and Written Opinion in PCT/US2014/062585 dated May 12, 2016.

*Primary Examiner* — John Fitzgerald
(74) *Attorney, Agent, or Firm* — Mossman, Kumar & Tyler, PC

(57) ABSTRACT

Apparatus, systems, and methods for investigating a subsurface volume of interest from a borehole. Apparatus comprise an enclosure configured for conveyance along the borehole; an acoustic source in the enclosure configured to generate acoustic signals; a lens assembly disposed in the enclosure and next to the acoustic source, the lens assembly being formed of a plurality of lens elements; wherein each lens element comprises a plurality of cells arranged in a curvilinear cell array, each cell formed as a column oriented transverse to a direction of travel of the acoustical signals. The plurality of cells may be arranged according to a conformal mapping geometry, including a canonical Bipolar conformal mapping transformation of constant [u,v] contour lines to [x,y] Cartesian coordinates. A portion of the cells are scaled down in size by a scale factor. The scale factor corresponding to each cell of the portion varies non-monotonically along periodicity lines.

18 Claims, 20 Drawing Sheets

(56) References Cited

U.S. PATENT DOCUMENTS

| | | |
|---|---|---|
| 2009/0199630 A1 | 8/2009 | DiFoggio et al. |
| 2009/0213690 A1 | 8/2009 | Steinsiek et al. |
| 2010/0101860 A1 | 4/2010 | Wassermann et al. |
| 2012/0000726 A1* | 1/2012 | Deymier ............... G10K 11/165 181/176 |
| 2012/0289869 A1* | 11/2012 | Tyler ..................... A61N 7/00 601/2 |
| 2013/0025961 A1* | 1/2013 | Koh ....................... F16F 15/02 181/207 |
| 2013/0030705 A1 | 1/2013 | Pei et al. |
| 2013/0100233 A1* | 4/2013 | Turqueti ................ H04R 1/326 348/14.02 |
| 2014/0126322 A1* | 5/2014 | Cipolla .................. G10K 11/18 367/1 |
| 2016/0220850 A1* | 8/2016 | Tyler ..................... A61N 7/00 |
| 2018/0024265 A1* | 1/2018 | Swett .................. E21B 47/0005 |

\* cited by examiner

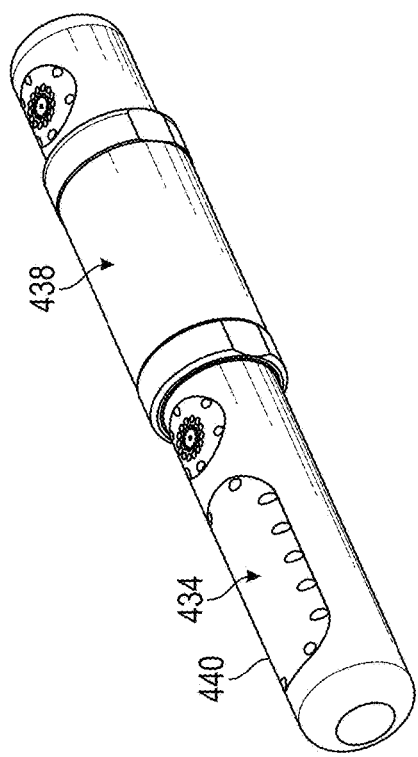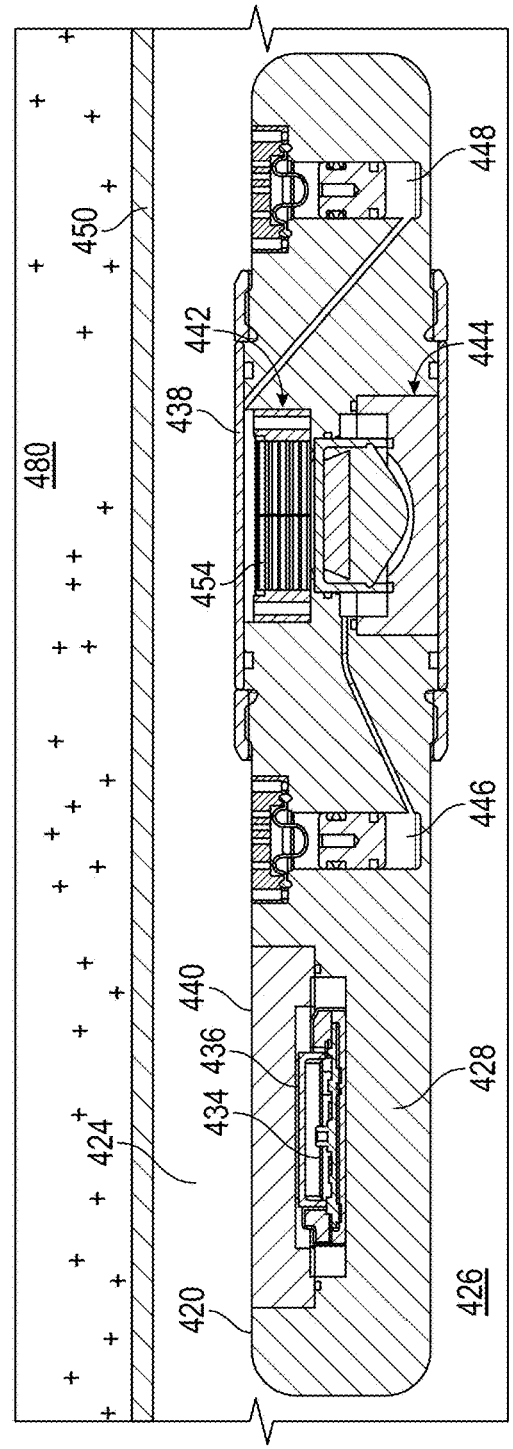
FIG. 4A
FIG. 4B

BIPOLAR ACOUSTIC HYPERLENS FOR DUAL-STRING THRU-CASING ULTRASONIC SENSORS

FIELD OF THE DISCLOSURE

This disclosure relates to acoustic sensors and methods of making and using such acoustic sensors in various tools, including acoustic logging tools.

BACKGROUND OF THE DISCLOSURE

Downhole acoustic logging tools, which are used to investigate subsurface features, can include one or more acoustic transmitters or sources and a number of acoustic receivers. These tools may also include a transceiver that can function as a transmitter and a receiver. In either case, the transmitters emit acoustic energy into the subsurface environment surrounding the wellbore. The acoustic signals are reflected by interfaces associated with the wellbore, well structures, and/or the formation. The reflected acoustic signals are detected by the receivers in the logging tool and processed to provide estimates of one or more properties of the wellbore, well structures, and/or the formation. The present disclosure provides acoustic sensors that utilize a metamaterial lens to manipulate such acoustic waves.

SUMMARY OF THE DISCLOSURE

Aspects of the present disclosure include apparatus, systems, and methods for investigating a subsurface volume of interest from a borehole. Apparatus may include an enclosure configured for conveyance along the borehole; an acoustic source in the enclosure configured to generate acoustic signals; a lens assembly disposed in the enclosure and next to the acoustic source. The lens assembly is formed of a plurality of lens elements, where each lens element comprises a plurality of cells arranged in a curvilinear cell array. Each cell is formed as a column oriented transverse to a direction of travel of the acoustical signals, and each cell having a hub, a plurality of spokes radiating from the hub, and a plurality of fingers circumferentially distributed around the hub, wherein the hub, spokes, and fingers are oriented to cause the acoustic waves to travel at a different speed in each of three orthogonal directions.

In general embodiments, the apparatus above may be implemented as an acoustic tool. The acoustic tool may include a transducer configured to generate and detect an acoustic wave in cooperation with the lens assembly. The lens assembly may be spaced-apart from the acoustic source. The plurality of cells may be arranged according to a conformal mapping geometry. The conformal mapping geometry may comprise a canonical Bipolar conformal mapping transformation of constant [u,v] contour lines to [x,y] Cartesian coordinates. A portion of the plurality of cells may each be scaled down in size by a scale factor from a largest cell dimension applicable to at least one cell of the plurality in order to fit within the conformal mapping. The scale factor corresponding to each cell of the portion may vary non-monotonically along periodicity lines of the conformal mapping. The rectangular [x,y] Cartesian coordinates may be related to the [u,v] contour lines by the relations:

$$x = R\left[\frac{\sinh(u)}{\cosh(u) - \cos(v)}\right], y = R\left[\frac{\sin(v)}{\cosh(u) - \cos(v)}\right].$$

In aspects, the present disclosure provides an apparatus for investigating a subsurface volume. The apparatus may include an enclosure configured to be conveyed along a wellbore, an acoustic transducer disposed in the enclosure and generating acoustical signals, an electronics assembly disposed in the enclosure and controlling the acoustic transducer, and a lens assembly. The lens assembly may be disposed in the enclosure and next to the acoustic transducer. The lens assembly may be formed of a plurality of lens elements. Each lens element may comprise a plurality of cells arranged in a curvilinear cell array. Each cell may be formed as a column oriented transverse to a direction of travel of the acoustical signals. Each cell may have a hub, a plurality of spokes radiating from the hub, and a plurality of fingers circumferentially distributed around the hub. The hub, spokes, and fingers may be oriented to cause the acoustic waves to travel at a different speed in each of three orthogonal directions.

In aspects, the present disclosure provides a method for investigating a subsurface volume. The method may include positioning an acoustic tool in a wellbore. The acoustic tool may include an enclosure configured to be conveyed along a wellbore, an acoustic transducer disposed in the enclosure and generating acoustical signals, an electronics assembly disposed in the enclosure and controlling the acoustic transducer, and a lens assembly. The lens assembly may be disposed in the enclosure and next to the acoustic transducer. The lens assembly may be formed of a plurality of cells. Each cell may be formed as a column oriented transverse to a direction of travel of the acoustical signals. Each cell may have a hub, a plurality of spokes radiating from the hub, and a plurality of fingers circumferentially distributed around the hub. The hub, spokes, and fingers may be oriented to cause the acoustic waves to travel at a different speed in each of three orthogonal directions. The method may include directing the acoustic waves through an adjacent aberrating media that at least partially blocks the direction of travel of the acoustic waves and into the volume of interest.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 4A-4D illustrate downhole tools and tool components in accordance with embodiments of the present disclosure;

DETAILED DESCRIPTION

Figure 1A:
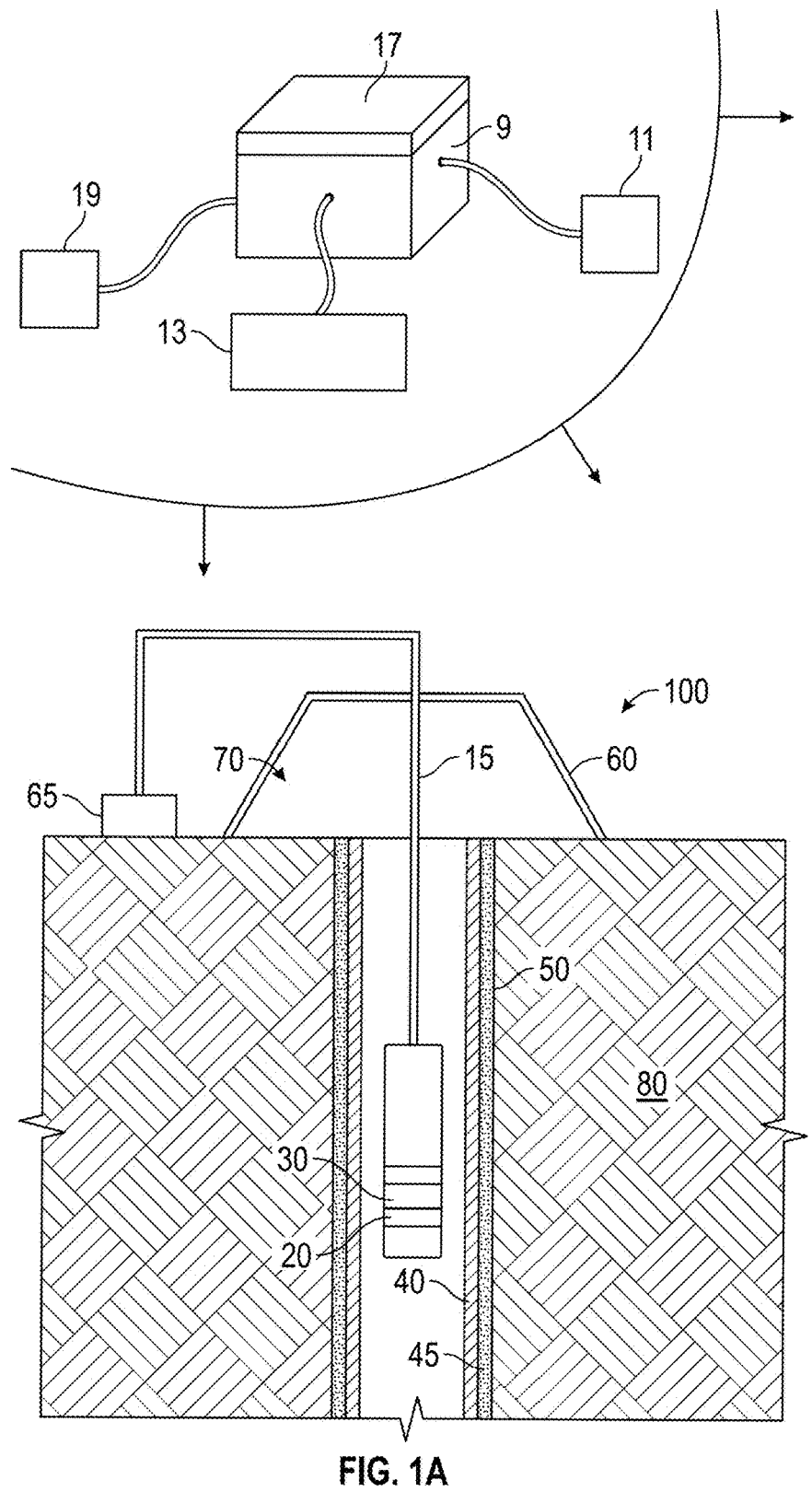
FIG. 1A schematically illustrates a downhole acoustic logging system having a downhole tool configured to acquire information using a sensor.

Aspects of the present disclosure include an ultrasonic hyperlens that may be employed in multi-string thru-casing imaging sensor implementations. In aspects, the present disclosure relates to acoustic devices and related methods for investigating a volume of interest when a signal transmission path to that volume of interested is partially or completely obstructed by an aberrating media. In aspects, the present disclosure also relates to acoustic devices and related methods for investigating a volume of interest when a signal transmission path from that volume of interested is partially or completely obstructed by an aberrating media.

There are a number of challenges that confront operators during the plugging and abandonment ('P&A') phase of a well lifespan. As one example, when a well is abandoned or plugged, permanent structures should be put in place as barriers to ensure isolation of all zones with a flow potential relative to each other and the surface or the seabed. The current method to achieve such isolation is to place cement in the wellbore to form plugs at appropriate locations to create the necessary seals for zonal isolation. The barrier plugs are set by cutting and pulling tubing and casing to expose the cap-rock to the cementing operation so that cement plugs can form a permanent seal. The location for placement of these cement plugs is, consequently, quite important.

Commonly, the time consuming task of removing casing and cement is undertaken due to the lack of an ability to obtain data and knowledge about the quality of the cement behind the casing from assessment through the tubing and casing. In the absence of such an understanding about the condition of the cement, prudence demands that the casing be removed from the well to allow for the setting of barriers into the cap-rock at locations suitable for zonal isolation. This operation to remove casing and cement is typically a significant expenditure.

Thus, the dearth of effective technologies that can determine the quality of cement through tubing and casing is problematic. The cement forms part of the well construction to provide structural support to the casing. A sound cement structure with good integrity also creates zonal isolation of hydrocarbons from the surface or seabed, as well as the underground water table. In this respect then, a good cement-to-pipe bond ensures safe abandonment of a well. With the ability to obtain a high-confidence log of the quality of the cement through tubing and casing, operations requiring cutting and removal of casing and cement may be significantly reduced.

For these and other downhole acoustic imaging applications, an acoustic lens enabling transmission and receiving ultrasound through aberrating media, such as, for example, multiple steel tubes and fluid annuli, is highly desirable. Aspects of the present disclosure include a lens derived from a matrix of artificial cells that give the lens unusual dynamic properties such as negative refractive indices and negative Poisson's ratios, as well as anisotropic moduli and density. Certain combinations of anisotropic density and modulus can create a hyperbolic frequency dispersion capable of sustaining the propagation of very high (spatial) frequency wave vectors.

U.S. patent application Ser. No. 15/040,677, submitted by the same inventor, discloses a rectangular acoustic hyperlens. As demonstrated in the previous application, this hyperlens shows significant through-casing transmission, but for multiple tubular aberrating media the transmitted acoustic intensity beam is more than 40 mm wide at the casing-to-cement interface. For multi-string thru-casing cement bond imaging, an intensity beam of less than one-half of this width would greatly improve results. In some implementations, a beam width of less than 15 mm is preferable. In addition, deployment of a flat acoustic hyperlens within a tool designed for 3" ID tubing—that is, conforming the original rectangular cross-section of the flat hyperlens to form within an approximate 2" sensor diameter for a wireline tool envelope while continuing to maintain the unusual dynamic properties associated with a hyperbolic frequency dispersion that create the transmission through aberrating media—is problematic.

Aspects of the present disclosure include techniques for meeting dimensional specifications of a downhole tool for the lens while maintaining the hyperlensing properties by using a geometric conformal mapping transformation on the cross-section of the original "flat" hyperlens. One example described herein is that of using a Bipolar conformal mapping coordinate transformation to create flow-lines of the lattice periodicity which converge to a small focus of a nearly collimated set of lines at the output of the lens.

General apparatus embodiments described herein include a lens assembly including a plurality of lens elements, where each lens element comprises a plurality of cells arranged in a curvilinear cell array. In the curvilinear cell array, the plurality of cells are arranged in a conformal mapping geometry. The conformal mapping geometry comprises a canonical Bipolar conformal mapping transformation of constant [u,v] contour lines to [x,y] Cartesian coordinates.

Each cell may be formed as a column oriented transverse to a direction of travel of the acoustical signals, each cell having a hub, a plurality of spokes radiating from the hub, and a plurality of fingers circumferentially distributed around the hub, wherein the hub, spokes, and fingers are oriented to cause the acoustic waves to travel at a different speed in each of three orthogonal directions.

Embodiments may include using at least one acoustic sensor to produce acoustic information responsive to an acoustic wave from the earth formation. The sensor may include at least one hyperlens along with at least one acoustic transmitter and/or at least one acoustic receiver, which may be implemented as transducers. In some implementations, the same transducer may serve as both transmitter and receiver. The information is indicative of a parameter of interest. The term "information" as used herein includes any form of information (analog, digital, EM, printed, etc.), and may include one or more of: raw data, processed data, and signals.

Methods may include estimating a parameter of interest from the information, evaluating the formation using the parameter of interest, and performing further borehole operations in dependence upon the evaluation or the parameter of interest. In particular embodiments, a state of drilling operations, characteristics of the borehole, casing, cement, or formation, or a bond between cement and casing, may be estimated using the parameter of interest, and then used in performing an operation as described above.

FIG. 1A schematically illustrates a downhole acoustic logging system 100 having a downhole tool 10 configured to acquire information using a sensor 20, comprising at least one acoustic transmitter and at least one acoustic receiver, while in a borehole 50 in an earth formation 80 and estimate a parameter of interest. The parameter of interest may relate to properties of the casing 40 or cement 45 within the borehole 50, or characterization of the bond between them.

The sensor 20 may include one or more acoustic transmitter and/or receivers. The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit.

A surface control system 65 receives signals from downhole sensor 20 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 30 at a suitable location on downhole tool 10. The surface control system 65 may process data relating to the operations and data from the sensor 20, and may control one or more downhole operations performed by system 100.

In one embodiment, electronics associated with sensor 20 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the sensor(s). Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user. Information may also be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the transducers, described in further detail below, may be configured to take measurements at a plurality of azimuthal orientations as the tool moves along the longitudinal axis of the borehole ('axially') using sensor 40. These measurements may be substantially continuous, which may be defined as being repeated at very small increments of depth and azimuth, such that the resulting information has sufficient scope and resolution to provide an image of borehole parameters (e.g., acoustic properties of the fluid in and formation at the borehole) or parameters relating to casing, cement, or the bond between them (collectively, "downhole parameters").

In other embodiments, electronics may be located elsewhere (e.g., at the surface, or remotely). To perform the treatments during a single trip, the tool may use a high bandwidth transmission to transmit the information acquired by sensor 40 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

A surface control system or downhole control system may be configured to control the tool described above and any incorporated sensors and to estimate a parameter of interest according to methods described herein. Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Figure 1B:
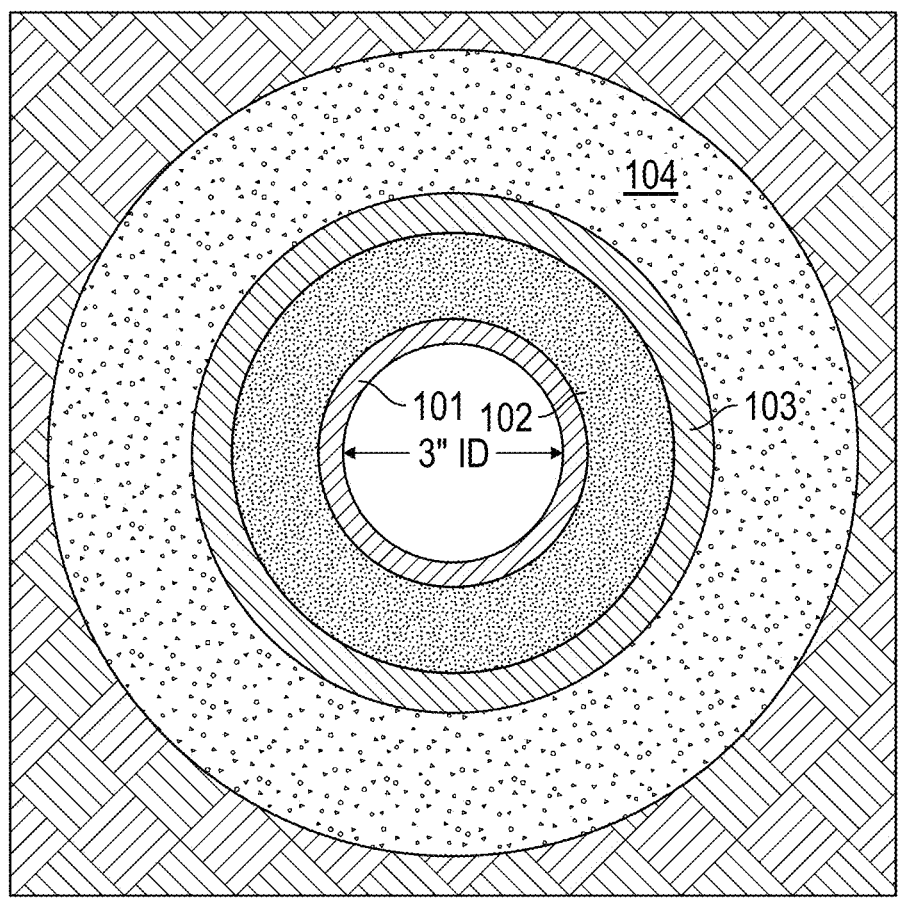
FIG. 1B is a graphical depiction a cross-section of well structures in place with respect to the borehole for operations in accordance with embodiments of the present disclosure.

FIG. 1B is a graphical depiction a cross-section of well structures in place with respect to the borehole for operations in accordance with embodiments of the present disclosure. The typical well-section includes production tubing 101, an annulus filled with downhole fluid 102, casing 103, and cement 104 in a borehole intersecting the formation 105 (e.g., cap-rock). The production tubing 101 may be a central steel tubing having an inner diameter as small as about three inches, with a wall thickness of about 0.25 inches, to as large as ten inches with a wall thickness of 0.50 inches. The downhole fluid 102 may be a roughly 1-inch to 2-inch annulus of mixtures of mud and oil and brine. Casing 103 may be, for example, a 0.5-inch thick steel casing. Cement layer 104 may be approximately two inches thick.

Figure 1C:
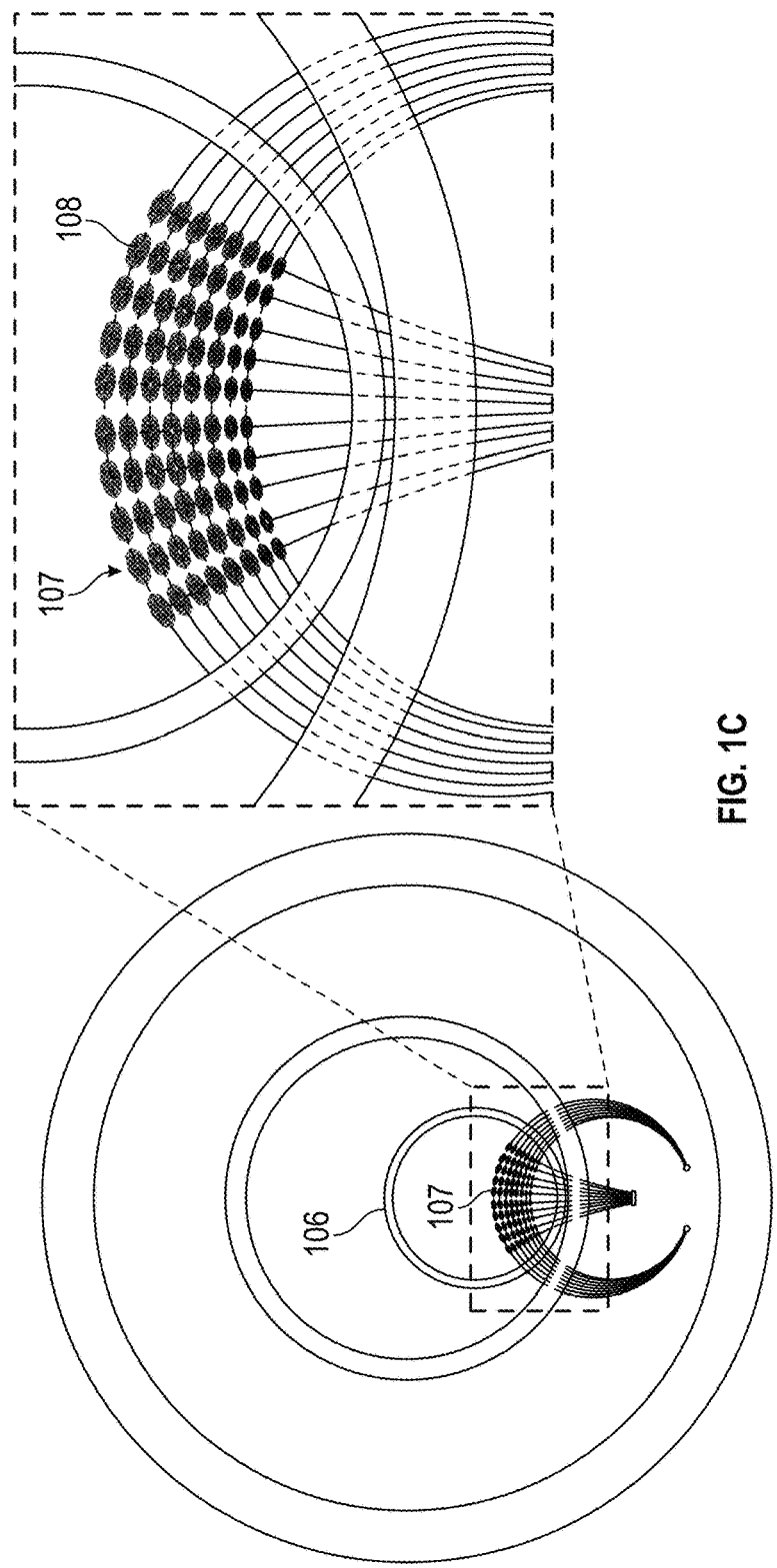
FIG. 1C is a graphical depiction of a tool-section at the bipolar acoustic hyperlens within the well structures in accordance with embodiments of the present disclosure.

FIG. 1C is a graphical depiction of a tool-section at the bipolar acoustic hyperlens within the well structures in accordance with embodiments of the present disclosure. The sensor sleeve 106 lies eccentrically within production tubing 101 and casing 103 in turn. A lens element 107 comprises a plurality of cells 108 arranged in a curvilinear cell array. The lens element comprises part of a lens assembly directed azimuthally.

The hyperlens geometry is constructed from a set of Bipolar constant coordinate contours with [x, y] coordinates located in the first and fourth quadrant of the Cartesian frame as illustrated in the inset. The cellular lattice is formed with curvilinear periodicity in both directions along the [u,v] contours, with scaling of the cell geometry anisotropically in order to fit and align the cell axes with the contour tangent and normal vectors. The inherent flow-lines of the lattice periodicity then converge to focus a nearly collimated set of lines, the location and size of which is determined by the selection of the mathematical parameter R and the [u,v] boundary values that define the lens profile. To a close approximation, these geometric focus lines translate into the acoustic wave propagation field and enhance thru-casing intensity transmission and spot-size concentration. The fundamental design of the artificial metamaterial cells that comprises the metamaterial hyperlens is discussed in further detail below.

Figure 1D:
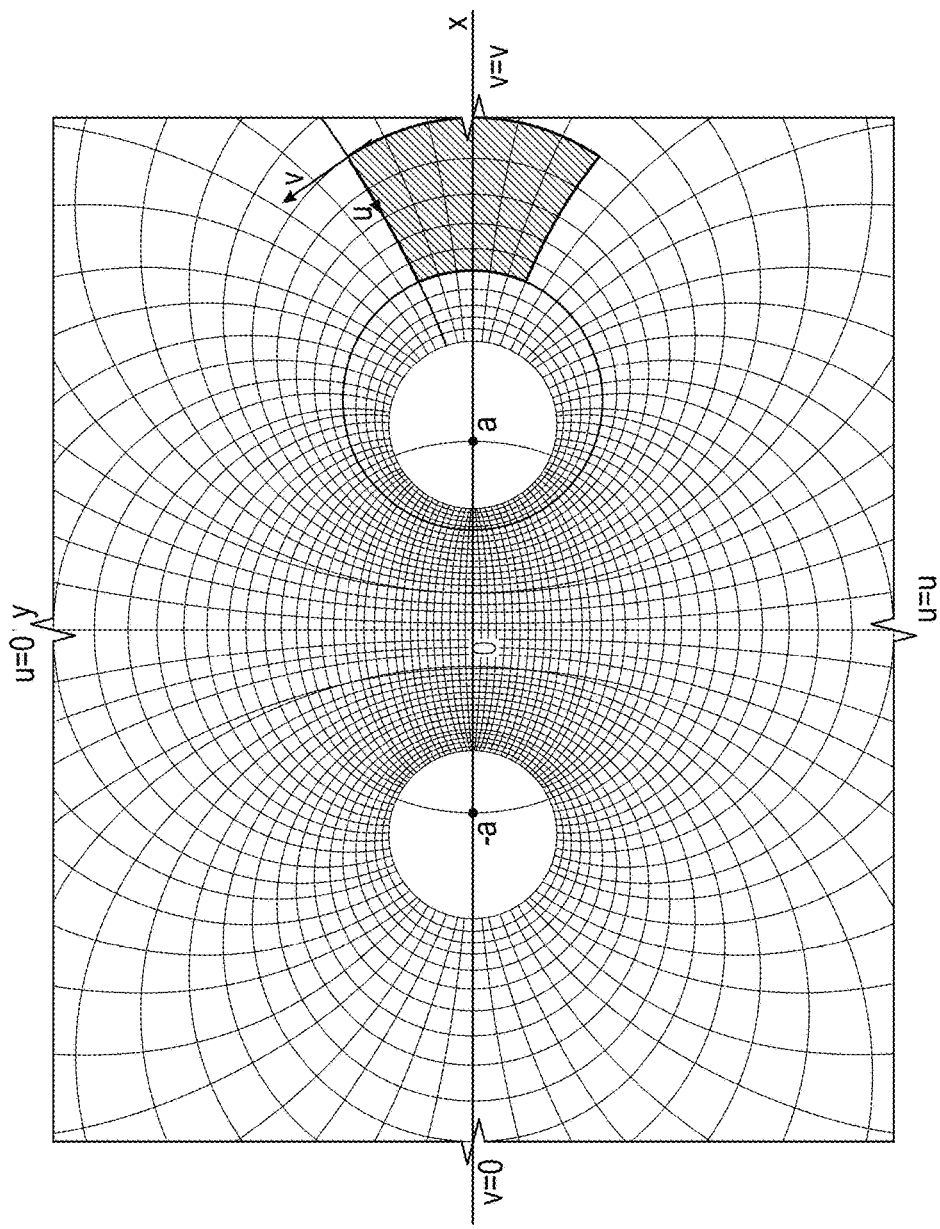
FIG. 1D illustrates a geometric conformal mapping transformation on the cross-section of the original rectangular hyperlens using a Bipolar conformal mapping coordinate transformation in accordance with embodiments of the present disclosure.

FIG. 1D illustrates a geometric conformal mapping transformation on the cross-section of the original rectangular hyperlens using a Bipolar conformal mapping coordinate transformation in accordance with embodiments of the present disclosure.

The rectangular Cartesian coordinates may be related to the mapped coordinates by the relations:

$$x = R\left[\frac{\sinh(u)}{\cosh(u) - \cos(v)}\right], y = R\left[\frac{\sin(v)}{\cosh(u) - \cos(v)}\right]$$

where [u,v] are the Bipolar conformal domain coordinates as illustrated in the constant coordinates [x, y] plot of FIG. 1C. See P. Moon and D. E. Spencer, Field Theory Handbook, New York: Springer-Verlag, 1971.

Figure 1E:
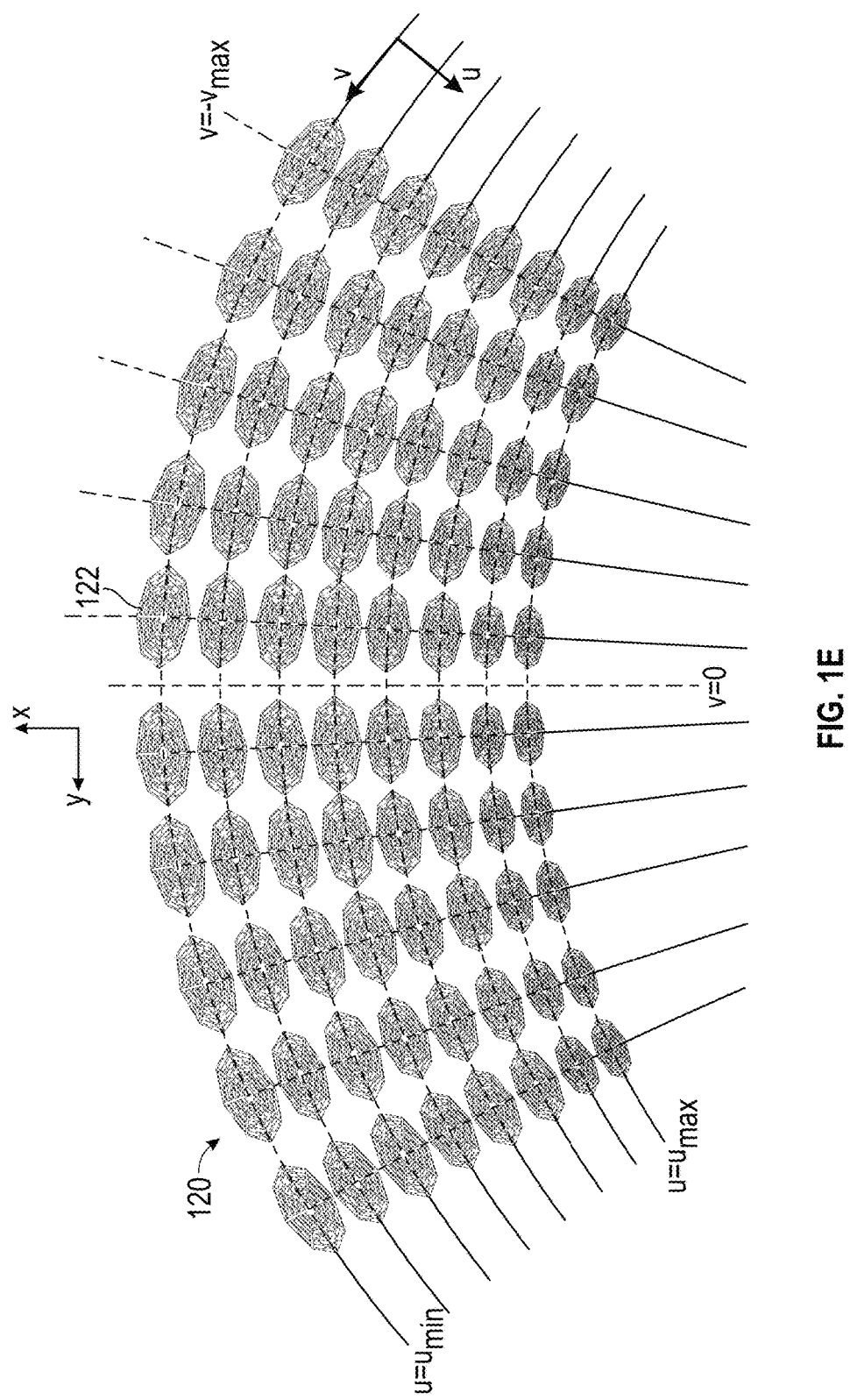
FIG. 1E shows a schematic diagram of a lens element in accordance with embodiments of the present disclosure.

FIG. 1E shows a schematic diagram of a lens element in accordance with embodiments of the present disclosure. The lens element 120 includes a plurality of cells 122. While the cells 122 are depicted as the same shape of the cells of FIG. 2B, below, the lens element 120 may include any cell configuration according to the present disclosure. The cells 122 are arranged edge-to-edge. An acoustic wave 104 enters the lens element 120 principally through an edge 126. The acoustic wave 134 travels through the lens element 120 in a direction that is perpendicular to the u contours. The cells 122 of the lens element 120 manipulate the acoustic wave 134 such that a manipulated wave 138 exits from an edge 130 of the lens element 120. In one non-limiting embodiment, a substrate 121 may be used as a support from which each of the cells 122 project. For example, the cells 122 may be grown from the substrate 121 such that the cells 122 and substrate 121 are integral. For instance, the substrate 121 may be a wafer. The cells 122 and the structurally independent features making up each cell 122 may project from the substrate 121 in a cantilever fashion.

The hyperlens lattice geometry of a lens element is configured according to the canonical Bipolar conformal mapping transformation of constant [u,v] contour lines to [x,y] Cartesian coordinates. Configuration may be carried out by building the lattice—that is, iteratively adding design elements to the mapping—as described in the workflow immediately below. The lattice formation begins with a "Seed-Cell" that is generally anisotropic in scaling and defines the reference cell building block for the lens matrix. The Seed Cell has a width $X_{cell}$ and height $Y_{cell}$. To begin the matrix population, the Seed-Cell is positioned at location (1) as identified in FIG. 1E, at the $u=u_{min}$ contour defined by the maximum curvature desired for the lens geometry. The maximum curvature may be determined iteratively from the constraints related to tool diameter, transducer design, and thru-casing transmission objectives. The Seed-Cell is moved along the constant $u=u_1=u_{min}$ curvilinear coordinate to a position $v=v_1$ corresponding to a y coordinate 5% larger than a half unit Seed-Cell ($X_{cell}$) spacing from the symmetry line (v=0). This location (1) now fixes the first constant v lattice line of periodicity.

The next cell is fixed to have a geometric anisotropy factor $S_{21}$, the same as the Seed-Cell ($S_{21}$-$S_{11}$), and with a scale factor $m_{21}$, where scale factor $m_{ij}$ is defined as $m_{ij}$=$Ycell_{ij}$/$Ycell_{seed}$. The location of the cell is selected by searching along the first lattice periodicity line $v=v_1$ in the direction of max $u=u_{max}$ until the first distance is found from the Seed-Cell location [$u_{min}$, $v_1$] that will allow the cell to fit with $S_{21}$=$S_{11}$. The scale factor required for the cell to fit within the curvilinear contours is calculated and stored as $m_{21}$ and the curvilinear coordinate line is stored as $u=u_2$. The process is repeated for the remaining cells along the $v=v_1$ lattice periodicity line up to location (8) and each scale factor calculated up to $m_{81}$ and stored. These $v=v_1$ cell locations now fix all the constant u lattice periodicity lines.

Next, the Seed-Cell is moved along the constant $u=u_1=u_{min}$ curvilinear coordinate to a position corresponding to a full unit Seed-Cell $X_{cell}$ spacing from the $v=v_1$. The process is repeated for the remaining cell locations along the $u=u_1$ curvilinear contour up to the $v=v_{max}$ boundary with equal anisotropy factors $S_{ij}=S_{11}$, and scale factors $m_{ij}=m_{11}$. These $u=u_1$ cell locations now fix all the constant v lattice periodicity lines and subsequently all the remaining matrix cell locations and the associated cell orientations.

The remaining cell geometric anisotropy factors $S_{ij}$ are all equal to the Seed-Cell $S_{11}$ and scale factors $m_{ij}$ are calculated under the constraint that each cell must fit within the set of constant curvilinear coordinate lines $u=(u_1, u_2, u_3 \ldots u_8)$, $v=(v_1, v_2, \ldots v_5)$. The lens lattice is symmetric about the $v=0$ contour, so the calculated cell locations are simply mirrored and the orientations reversed to obtain the entire lens lattice.

Figure 1F:
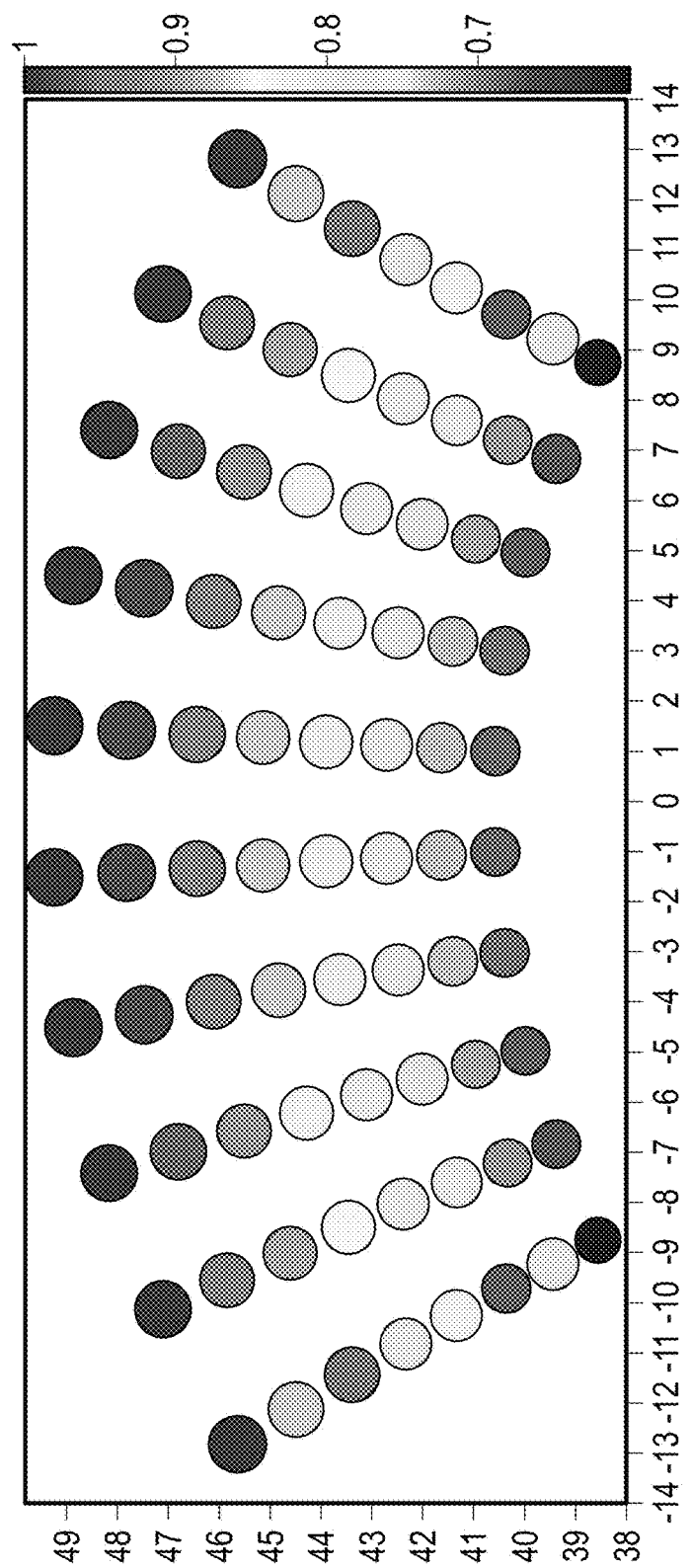
FIG. 1F shows a plot of the cell locations and the corresponding scale factors $m_{ij}$.

FIG. 1F shows a plot of the cell locations and the corresponding scale factors $m_{ij}$. It is apparent that the variation in the scale factors is not monotonic along the [u,v] lattice periodicity lines but oscillates non-uniformly.

Figure 2:
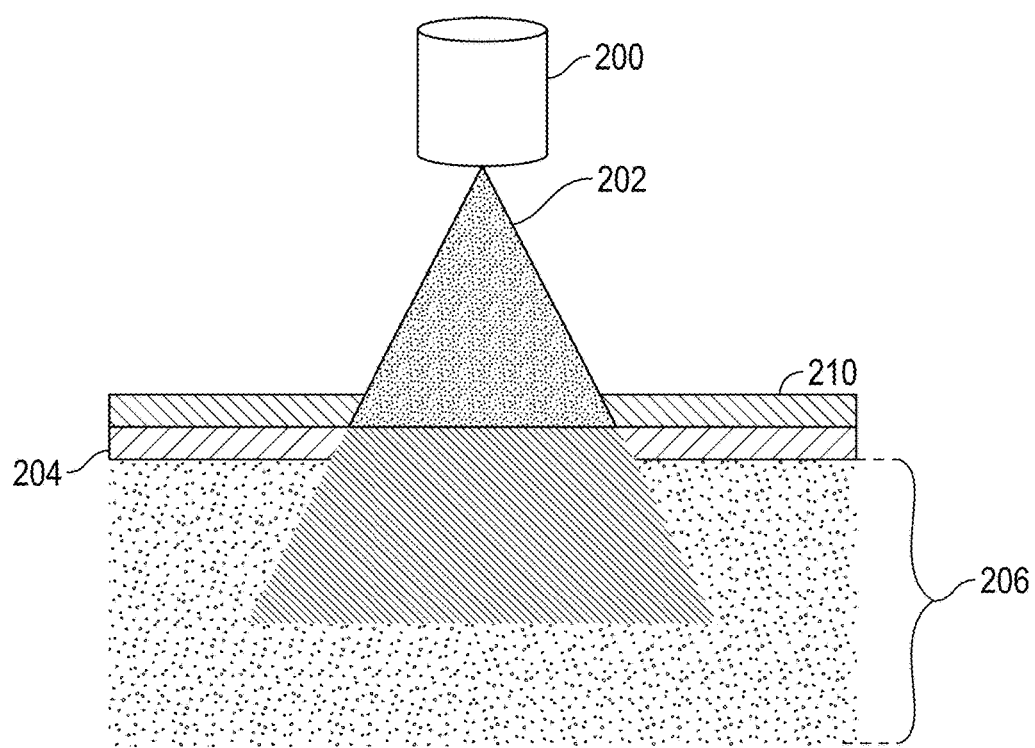
FIG. 2 is a schematic diagram of an acoustic tool in accordance with the present disclosure that emits an emitted acoustic signal that is distorted less by an aberrating media.

FIG. 2 illustrates a source 200 for generating a signal 202, which may be sonic or ultrasonic. An aberrating media 204 may partially or completely obstruct the path of the signal 202 to a volume of interest 206. By obstruct, it is meant that the media 204 has one or more properties or characteristics that can block, distort, refract, reflect or otherwise undesirably affect the signal 202.

Embodiments of the present disclosure position a lens 210 formed of an acoustic metamaterial between the source 200 and the aberrating media 204. The lens 210 is shaped and configured to manipulate the signal 202 in a manner that minimizes undesirable effects in the signal 202 due to the aberrating media 204. Specifically, the lens 210 may have anisotropic properties and may transmit longitudinal acoustic waves at a different speed in each of three orthogonal directions. The metamaterial making up the lens 210 may also deform with a different bulk moduli in each of the same three orthogonal directions. As a result, the lens 210 may be characterized by an anisotropic density tensor (diagonalized) and an anisotropic bulk modulus tensor having terms that are highly frequency dependent. In certain instances, these characteristics may generate an unnatural manipulation of incident acoustic energy that enhances evanescent, or rapidly disappearing, wave vector components of incident energy. This manipulation of acoustic energy can lead to the formation of complementary or quasi-complementary wave vectors that transmit the acoustic energy through an adjacent aberrating media with minimal loss or distortion relative to the incident energy.

The characteristics of such metamaterials derive from the basic dynamic mechanism of resonances, occurring in aggregate, to affect the creation of material properties beyond the bounds of Nature. In the particular case of acoustic metamaterials, these characteristics begin directly from the frequency response behavior of the two basic material parameters: effective mass density and effective bulk modulus. Both of these material parameters can take on negative attributes and even anisotropic behavior in the presence of particular types of resonance transition zones, specifically within proximity of anti-resonances. These anisotropic and negative properties can give rise to a wide range of spectral features within certain frequency bands, including negative refraction and hyperlensing, which can open possibilities for beam focusing and amplification in flat lenses. Actions such as focusing and amplification will be generally referred to as manipulating an acoustic wave.

Negative index properties arising from unit cell resonance within the frequency band may occur over a very narrow spectral bandwidth, the range of which is an effect of the resonance characteristics of the unit cell and the properties of the matrix and/or background fluid. In order to affect these negative properties over a broader frequency range, a multitude of compatible resonances in the elemental cell must couple constructively. This can be achieved through the metamaterial unit cell designs of the present disclosure.

There are several factors determining whether a particular unit cell design can affect the dispersion characteristics of a propagating wave to the extent of exhibiting anisotropic and negative index properties behavior necessary for hyperlensing. One particularly relevant factor is the creation of an aggregate of resonances in the transmission coefficient spectra that will couple to form a wide band of wave manipulation in the frequency range of interest. Whether the frequency band formed from the aggregate will give rise to anisotropic and negative index responses is a function of other properties of the resonance couplings. The extent to which a unit cell design exhibits significant acoustic impedance mismatch, absorption loss, and/or significant magnitude of bulk modulus are dominant influences, since any one of these can negate the hyperlensing effect in the frequency band. Cells according to the present disclosure may be referred to as elemental components in the superlens or hyperlens, depending on their characteristics.

FIGS. 3A-3D show exemplary metamaterial cells for manipulating an acoustic wave in accordance with the present disclosure. Beginning with FIG. 3A, generally speaking, each cell 310 is a platen and disc like member. The cell 310 has two opposing planar surfaces that are parallel. As illustrated, the visible planar surface 313 is parallel with the paper. The distance between the two surfaces, or thickness, may be in the range of 1 millimeter to 100 millimeter. The diameter of a circle enclosing the cell 310 may be in the range of 1 millimeter to 5 millimeter. These dimensions are generally selected to allow phenomena such as resonances to have a measurable influence on the behavior of the cell 310 and affect wave manipulation in the particular frequency ranges of interest. The cells, such as cell 310, of the present disclosure may be formed of metals or non-metals. Suitable metals include, but are not limited to, steel, platinum, tungsten, gold, and exotic options such as iridium, with the important material property for acoustic wave manipulation being the mass density of the metal.

One non-limiting embodiment of a cell 310 may include a hub 312, a plurality of spokes 314 radiating from the hub 312, and a plurality of concentrically arranged leaves 316. The hub 312 acts as a central support structure for the spokes 314. In the embodiment shown, the hub 312 is formed of four separate segments, an illustrative segment being labeled with numeral 318. The hub 312 may be circular or have any other suitable geometric shape. Also, while four segments 318 are shown, the hub 312 may be formed as a single integral body or have two or more segments 318. Each segment 318 is physically connected to one or more spokes 314.

The spokes 314 provide the structure for supporting the leaves 316. An illustrative spoke is labeled with numeral 320. The spoke 320 may be formed as an elongated bar having one or more necks 322. A neck 322 is a section of the spoke 320 that has a cross-sectional area that is smaller than the immediately adjacent cross-sectional areas. Thus, the spoke 320 is more flexible at the necks 322 and can bend, twist, or otherwise deform more easily at the necks 322 than at other locations along the spoke 320. In one arrangement, the necks 322 are formed immediately adjacent to and radially inward of each juncture 324 between the spoke 320 and the leaf 316. Also, a neck 322 may be immediately radially outward of a juncture 326 between the spoke 320 and the hub 312.

Each of the leaves 316 may include a circumferentially distributed array of fingers 328 arranged in the form of a circle. Each finger 328 is cantilevered from the juncture 324. While two fingers 328 are shown at each juncture 324 with an orientation transverse to the spoke 320, greater or fewer fingers 328 and different orientations may be used. The finger 328 may be a curved member that includes one or more enlarged sections 330. An enlarged section 330 has more mass than an immediately adjacent section of the finger 328. The increased mass is formed by providing the enlarged section 330 with a larger width than other sections of the finger 328. Thus, there may be an asymmetric mass distribution along the length of the finger 328. To interleave the fingers 328, the radial positions of the finger 328 are staggered for each successive spoke 314. Thus, a finger 328 of one spoke 314 may nest radially between two fingers 328 of an adjacent spoke 314. While six leaves 316 are shown, greater or fewer leaves 316 may be used.

Figure 3A:
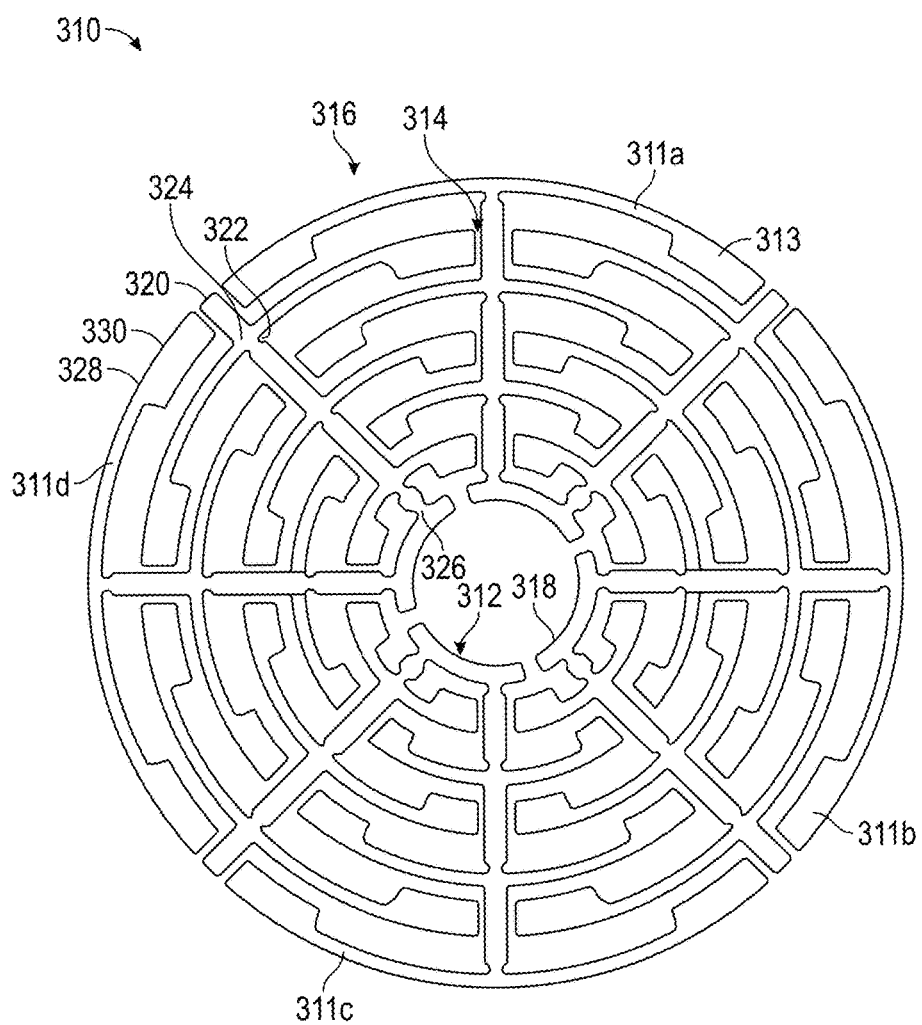
FIGS. 3A-3D show exemplary metamaterial cells for manipulating an acoustic wave in accordance with the present disclosure.

The cell 310 of FIG. 3A has four segments 311a-d. Each segment 311a-d has two spokes 314 radiating from a hub segment 318. Each spoke 314 has three sets of fingers 328. Each set has two fingers 328a,b. The fingers 328 are circumferentially distributed to form six leaves 316. It should be noted that the four segments 311a-d are structurally independent with one another. While the elements making up each of the segments 311a-d have been described separately, it should be understood that each segment 311a-d may be manufactured as a unitary body as opposed to being assembled from discrete components. It should also be noted that while four segments are depicted, the cell 310 may use fewer or greater number of segments.

The resonances and anti-resonances within the cell 310 are affected by the interaction of the various structural features through the matrix or background fluid medium described above. Thus, the number, size, shape, and orientation of features such as the spokes 314, leaves 316, fingers 328, and enlarged sections 330 influence where and to what extent resonances and anti-resonances occur and how they complement or negate one another in affecting manipulation and control of the incident acoustic wave.

Figure 3B:
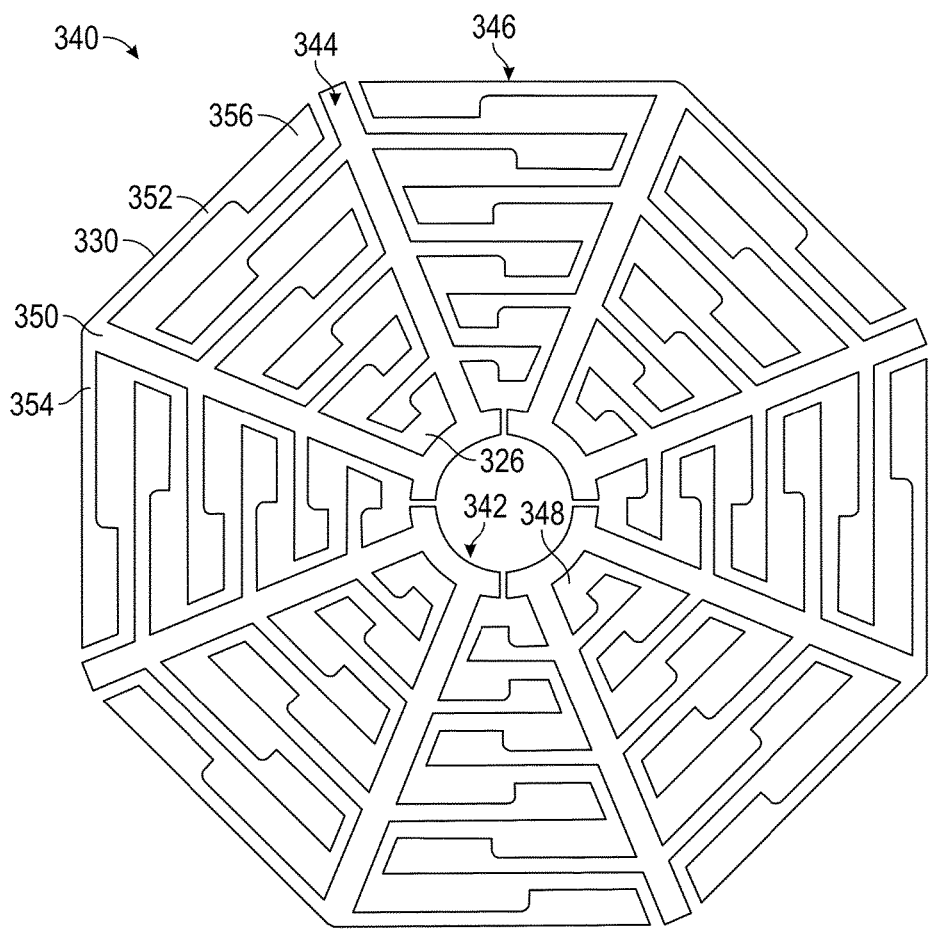

Referring to FIG. 3B, there is shown another embodiment of a cell 340 for manipulating an acoustic wave. The general shape and dimensions of the cell 340 is similar to those of cell 310 (FIG. 3). The cell 340 may include a hub 342, a plurality of spokes 344 radiating from the hub 342, and a plurality of concentrically arranged leaves 346. The cell 340 is similar to the cell 10 of FIG. 3A in many aspects. The variations of the cell 340 are discussed below.

As before, the spokes 344 provide the structure for supporting the leaves 346. An illustrative spoke is labeled with numeral 350. In this embodiment, the spoke 350 may be formed as an elongated bar that does not include any reduced cross-sectional areas. Also, the leaves 46 may include a circumferentially distributed array of fingers 352, with each finger 352 being cantilevered from a juncture 354. In this arrangement, the fingers 352 are straight members that include one or more enlarged sections 356.

In FIG. 3B, the leaves 346 are arranged as a plurality of concentric polygons. In the illustrated arrangement, the each of the leaves 346 has an octagon shape. However, other polygon shapes may be used. As before, the fingers 352 are interleaved by staggering the radial positions of the fingers 352 for each successive spoke 344. The cell 40 of FIG. 3B has four segments configured in the same manner as the cell 310 of FIG. 3A. However, any number of segments may be used.

Figure 3C:
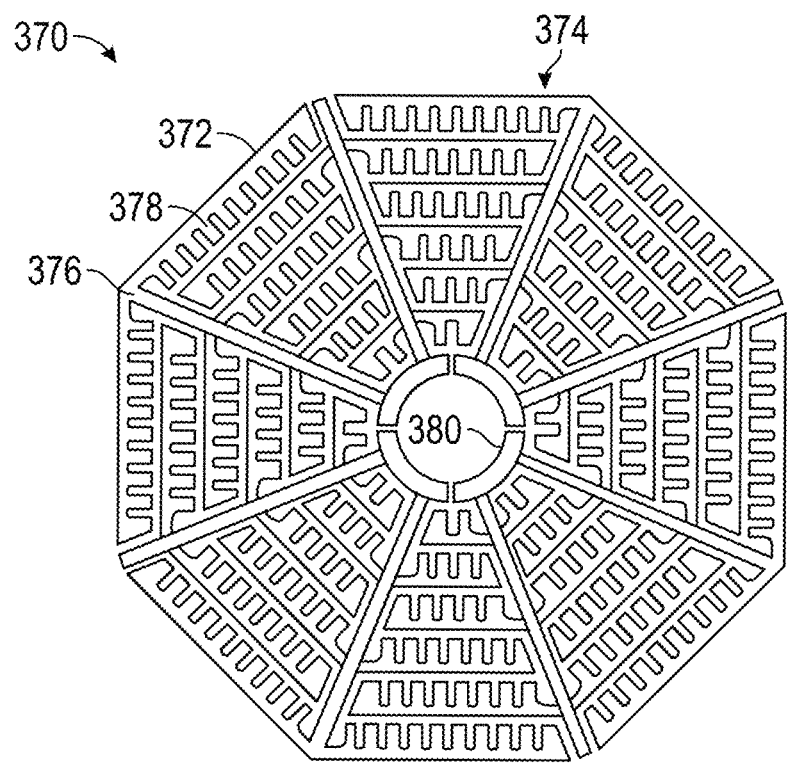

Referring to FIG. 3C, there is shown another embodiment of a cell 370 for manipulating an acoustic wave. In a manner previously discussed, the fingers 372 of each leaf 374 are cantilevered from a spoke 376. In this embodiment, the fingers 372 have projections 378 that are oriented transverse to the fingers 372. Each of the projections 378 may be tab or bar like elements that can move independently relative to one another. By moving, it is meant bending, twisting, vibration, etc. While the projections 378 are shown projecting radially inward to a hub 380, it should be appreciated that the fingers 372 may be arranged to have the projections 378 project radially outward, or both.

The shape, size, number, and orientation of the projections 378 within each leaf 374 and between the leaves 374 may be varied in order to influence the resonant behavior of the cell 370. Thus, for instance, the projections 378 may be of different sizes along a finger 372 and each of the fingers 372 may have a different number of projections 378.

Further, the cells according to the present disclosure need not be symmetric or quasi-isotropic as shown in FIGS. 3A-3C.

Certain embodiment of the present disclosure may incorporate anisotropy in the shape factor to influence the bandwidth and hyperlensing effect of negative index resonant bandwidths formed by a cell. In one methodology, anisotropy may be applied by invoking geometry shaping transformations that maintain the invariance of the Helmholtz wave equation; e.g., a Joukowsky shaping transformation. For instance, the transformation may be described by the relation:

$$\xi = Z + \frac{b^2}{Z}$$

with the original cell coordinates:

$$Z = x + iy$$

and the transformed (shaped) cell coordinates:

$$\xi = u + iv$$

A Joukowsky shaping may transform the FIG. 3B octagonal cell boundary that can be circumscribed by a circle of radius R into a shaped cell geometry that can be circumscribed by the ellipse with shaping factor S=a/b where a and b are the elliptical dimensions collinear with the x and y axes, respectively. All remaining coordinates in the original interleaf cell geometry transform according to the same shaping factor S. Therefore, the Joukowsky transformation for an octagonal interleaf cell is:

$$[u + iv] = x\left[\frac{2S}{S+1}\right] + iy\left[\frac{2}{S+1}\right]$$

Figure 3D:
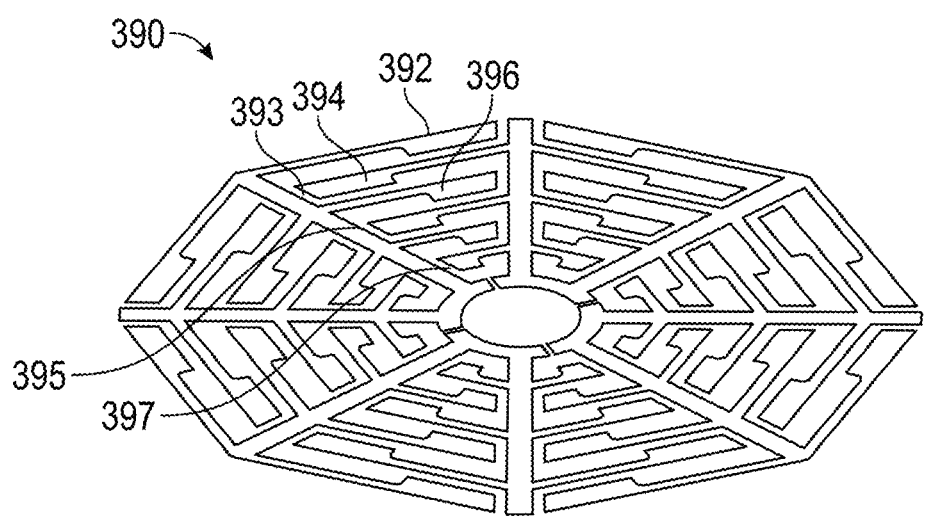

These equations may be used to transform the 2D geometrical [x,y] coordinates of the cross-section for the quasi-isotropic cell illustrated previously in FIG. 3B with an anisotropic Joukowsky transformation with shape factor S=2 anisotropy in the cell shape. The resulting anisotropic cell 390 is shown in FIG. 3D. The S=2 anisotropy is merely one illustrative value. One feature of the anisotropic shaping is that a thickness of at least two fingers varies non-linearly along the plane on which a cell lies. For example, the thickness of fingers, 392, 394, and 396 are different and the difference is mathematically non-linear. The comparison of thickness may be done by selecting the same feature (e.g., an enlarged section) and measuring a distance along the same location along the same axis. For instance, the edges 393, 395, and 397 may be used as a measure of the thickness of the transformed sections of the fingers. An anisotropic shaping may also be applied to the cells of FIG. 3A or 3C, or other cell configurations according to the present disclosure.

Figure 4D:
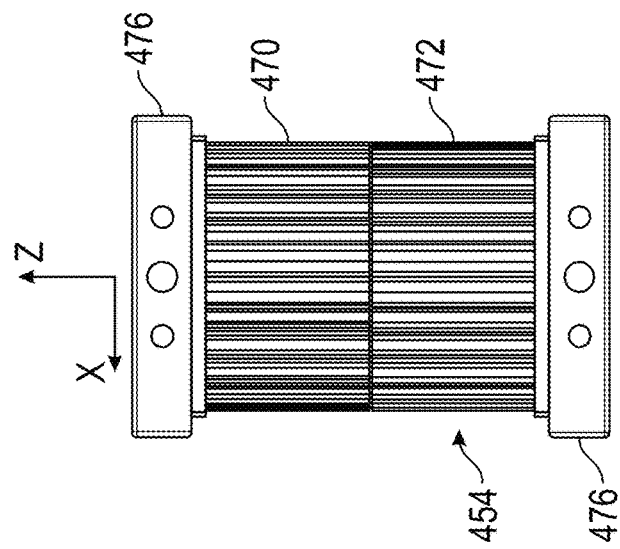

FIGS. 4A-4D illustrate downhole tools and tool components in accordance with embodiments of the present disclosure. Referring to FIG. 4A, there is shown one embodiment of an acoustic tool 420 according to the present disclosure. A perspective view is shown in FIG. 4B. The tool 420 may be conveyed by a suitable conveyance device (not shown) along a borehole 424 drilled in an earthen formation 426. The conveyance device may be a non-rigid carrier such as a wireline, e-line, slick-line, or coiled tubing, a rigid carrier such as drill pipe, a drop tool, or an autonomous device. In one non-limiting embodiment, the tool 420 includes an enclosure 428 that has an acoustic source cavity 430 that receives an acoustic source assembly 432 and an electronics cavity 434 that receives an electronics assembly 436. A cavity sleeve 438 seals and encloses the acoustic source assembly 432 in the acoustic source cavity 430. The window 438 may be constructed and formed to have similar acoustic impedance with the fluid filling the lens cavity 442; e.g., fabricating the window from Teflon material and using pure water as the lens cavity fluid. A cover 440 seals and encloses the electronics assembly 436 within the electronics cavity 434. The acoustic source cavity 430 may have a lens section 442 and a source section 444. Pressure compensation cavity 446 and 448 equalize the pressure between the exterior of the enclosure 428 and the sections 442 and 444, respectively. The pressure compensation fluid in source section 444 will in general have acoustic impedance properties different than those of the fluid in lens section 442. The fluid properties in lens section 442 are variables dictated by the cell acoustic properties and the frequency range desired.

The acoustic source assembly 432 generates and emits acoustic energy that can pass through an aberrating media with reduced distortion. In some situations, the aberrating media may be the metal making up a well tubular, such as a casing 450. In one embodiment, the acoustic source assembly 420 includes a transducer 452 and a lens 454. The transducer 452 may be any device configured to generate and receive sonic or ultrasonic signals. One illustrative non-limiting source may include piezoelectric elements.

Figure 4C:
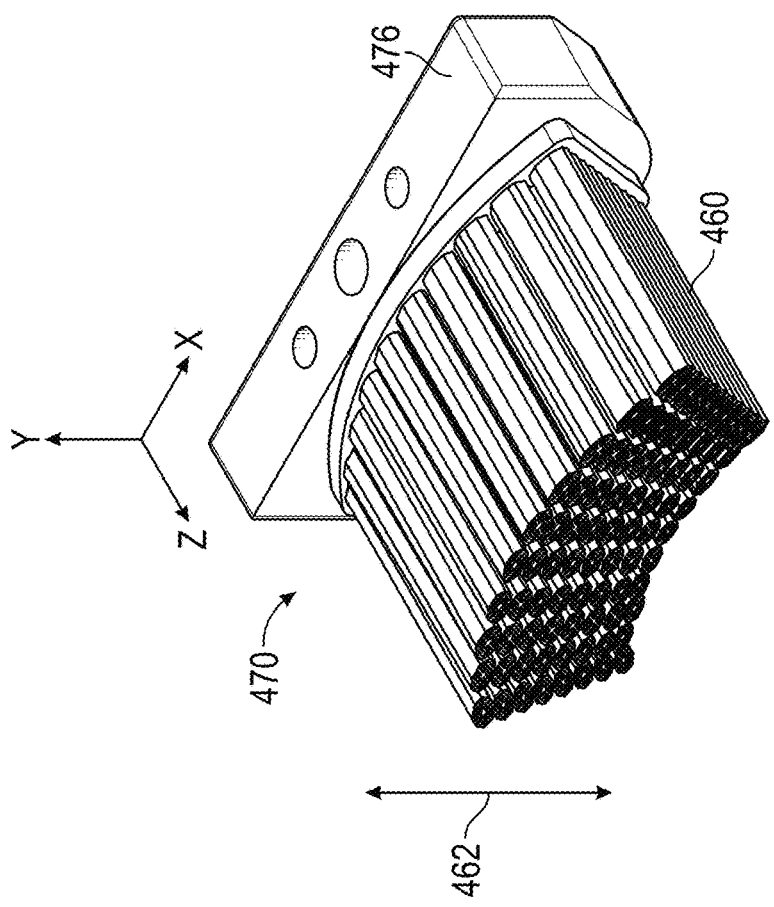

The lens 454, which is better illustrated in FIGS. 4C and 4D, includes a plurality of cells 460 arranged in an array as described above with respect to FIG. 1E. Each cell 460 may be shaped as a column that extends orthogonally/transversely to a direction of signal propagation, which is shown with arrow 462. The illustrated embodiment includes two lens elements 470, 472, each of which has a base 476 from which the cells 460 project in a cantilever-type fashion. The sections 470, 472 are arranged to mirror one another. Further, the cells 460 are aligned such that two facing cells 460 form effectively one column-like structure between the two bases 476. The facing cells 460 may be separated by a gap, contact one another, or be fixed to one another. In embodiments, one end of the cell 460 may be fixed or both ends may be fixed. The cells 460 may have any of the cross-sectional shape and structures that were discussed herein. It should be understood that the lens assembly 454 is not limited to any particular distribution of cells 460 or that such a distribution be symmetric or conform to a particular geometric shape, except as otherwise explicitly indicated above. It should also be understood that the lens assembly 454 may include only one element (e.g., section) 470, from which the cells 460 project. Also, the lens assembly 454 may include an arrangement wherein two bases 448 are spanned by one cell 460 as opposed to two facing cells.

The electronics assembly 436 may include suitable electronics, microprocessors, memory modules, algorithms, power supplies, and circuitry in order to drive and sense the acoustic transducer 452. The electronics assembly 436 may also include bi-directional communication hardware in order to transmit and/or receive data signals.

Figure 8:
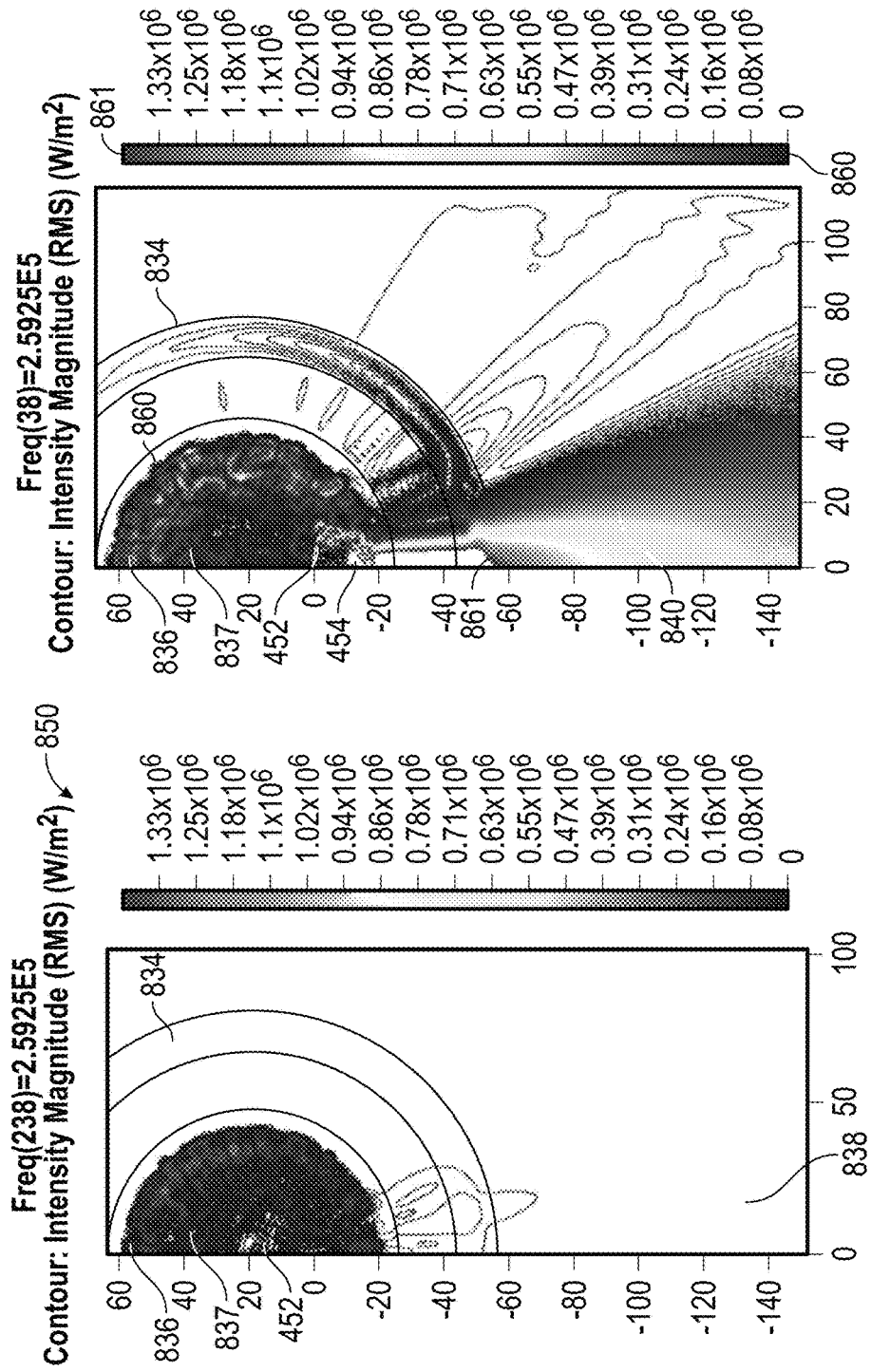
FIGS. 8A & 8B show contour plots illustrating the acoustic intensity of acoustic waves emitted by a transducer in a casing, fixed in a borehole, that is filled by a borehole fluid without and with a lens assembly of the present disclosure.

Referring to FIGS. 4A-4D, an illustrative mode of operation of the acoustic tool 420 involves evaluating a cement body 480 (FIG. 8), i.e., a volume of interest, that surrounds a well casing 450. The well casing may be formed of a metal, such as steel. The evaluation may include estimating a quality of the contact or bond between the cement and the well casing 450. During use, the electronics assembly 436 activates the acoustic transducer 452. In response, the acoustic transducer 452 emits acoustical waves through the lens 454 along the arrow 462. The acoustic waves may be sonic or ultrasonic and may have a narrow or wide frequency band. It should be noted that the waves enter the cells 420 along a surface facing toward the acoustic transducer surface and exit the cells 420 along a surface facing away from the acoustic transducer 452. Thereafter, the acoustical waves pass through the well casing 450 and into the cement body 480. As discussed previously, the lens 454 manipulates the acoustic waves in a manner that allows these waves to pass through the metal of the well casing 450 with reduced distortion. A reflected wave 430 returns from the formation and enters the lens 454. After being manipulated by the lens 454, the wave 420 enters the transducer 452 and is processed.

The lens 454 can reduce distortion in acoustic signals that have already travelled through the aberrating media 204 as well as for acoustic signals travelling into the aberrating media 204. That is, the lens 454 can manipulate an acoustic signal emitted into the aberrating media 204 and also manipulate a reflected signal from the zone of interest 206 that has travelled through the aberrating media 204. Thus, the transducer 452 can act as a signal emitter and a signal detector.

Generally, it is desirable to evaluate a parameter or characteristic, such as a cement bond, along a complete circumference at a specified depth in the well. Thus, embodiments of the present disclosure may mount the tool 420 on a platform that is rotated by a suitable rotary device such as an electric or hydraulic motor. In some instances, the conveyance device on which the tool 420 is mounted, e.g., a drill string, may be rotated. In still other embodiments, a stationary array of two or more tools 420 may be circumferentially distributed along a plane in order to obtain full circumferential coverage.

Figure 5A:
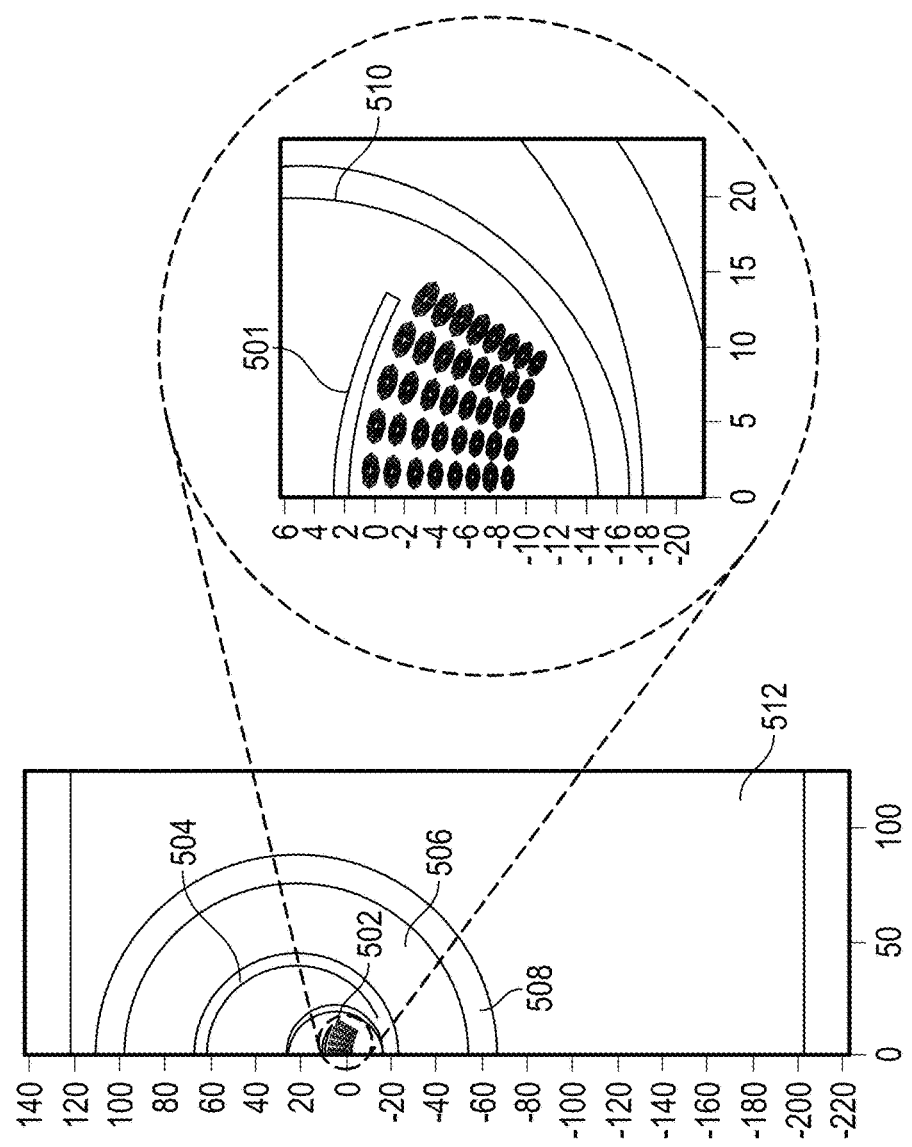
FIGS. 5A & 5B illustrate a model simulating performance of apparatus embodiments in accordance with the present disclosure.
Figure 5B:
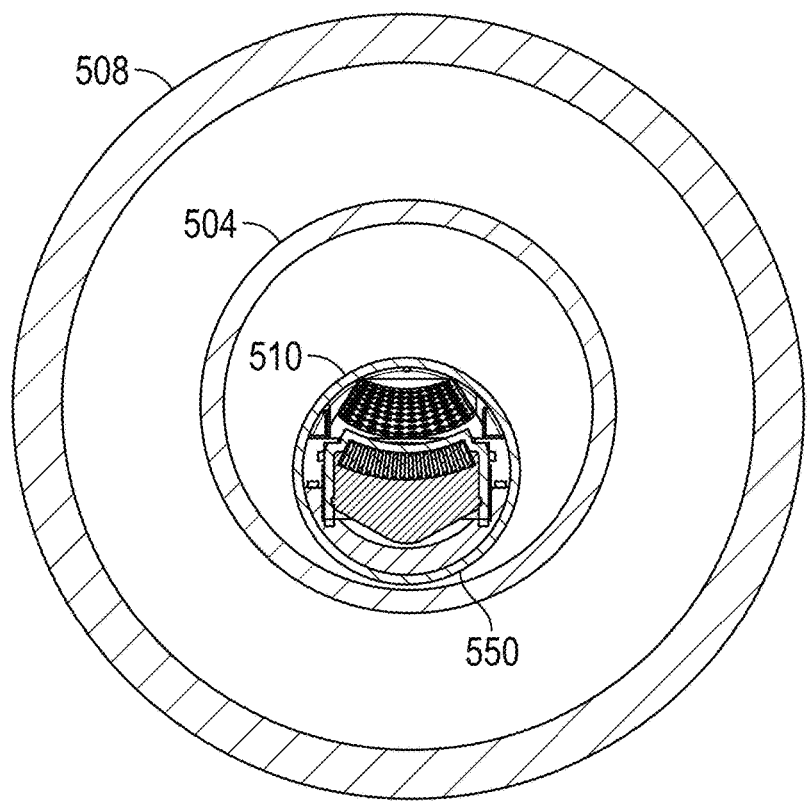

FIGS. 5A & 5B illustrate a model simulating performance of apparatus embodiments in accordance with the present disclosure. A finite element model 500 was developed having the Bipolar hyperlens 502 completely immersed in a water background inside a Teflon sleeve 510 (2 mm thick). The wellbore fluid inside the production tubing and the casing is a typical mud 506. The fluid outside the casing is a semi-infinite cement domain 512. The acoustic source is an idealized (rigid) pressure source 501 emitting from a R27.5 mm cylindrical boundary with a 1 mm gap 550 between the source and the hyperlens 502. The Teflon sleeve 510 is located eccentric within the production tubing 504 to form a 1 mm gap between the Teflon sleeve and the tubing ID. The tubing 504 is concentric with the casing 508.

Figure 6:
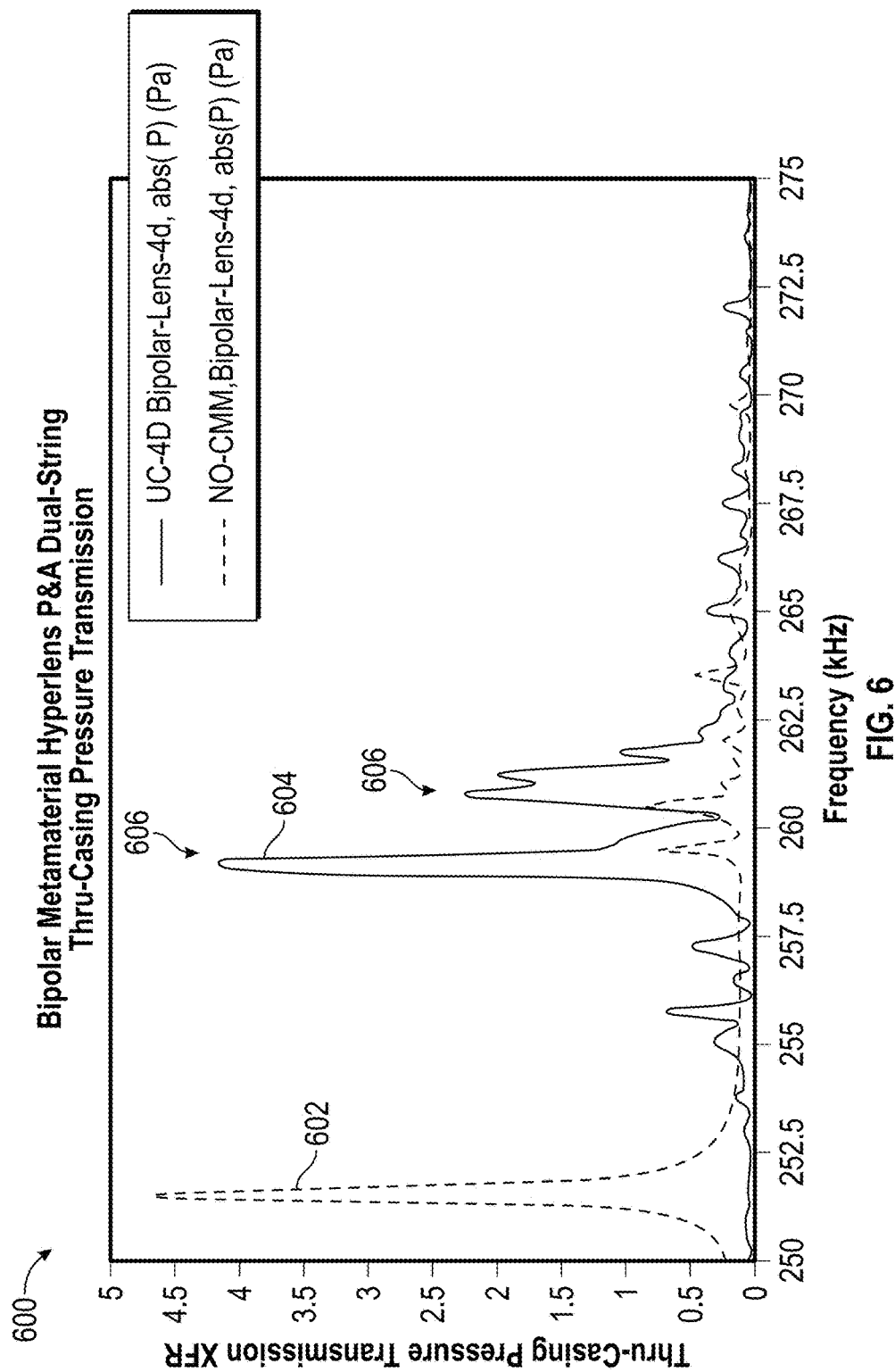
FIG. 6 shows a graphical depiction of illustrative theoretical plots of thru-casing pressure transmission.

FIG. 6 shows a graphical depiction 600 of illustrative theoretical plots of thru-casing pressure transmission. Graphical depiction 600 was derived from simulation results for the dual-string scenario with the idealized (rigid) source using finite element analysis. Curve 602 illustrates the pressure of an acoustic transmission over a range of frequencies for a signal through the dual string section with one-half inch metal casing. This signal is transmitted directly into the one-half inch casing. Curve 604 illustrates the pressure of an acoustic transmission over a range of frequencies for a signal through the dual string section with one-half inch metal casing. However, the signal of curve 604 is first manipulated by a lens as described above that has a cell with geometries as discussed above before entering the dual string section. Peaks 606 may occur as shown at particular frequencies. It should be noted that the simulation having the metamaterial hyperlens enhances the thru-casing acoustic pressure transmission with an amplification of the ideal source pressure by more than four times in the casing-cement bond, at the hyperlens design resonance of 259 kHz.

Figure 7:
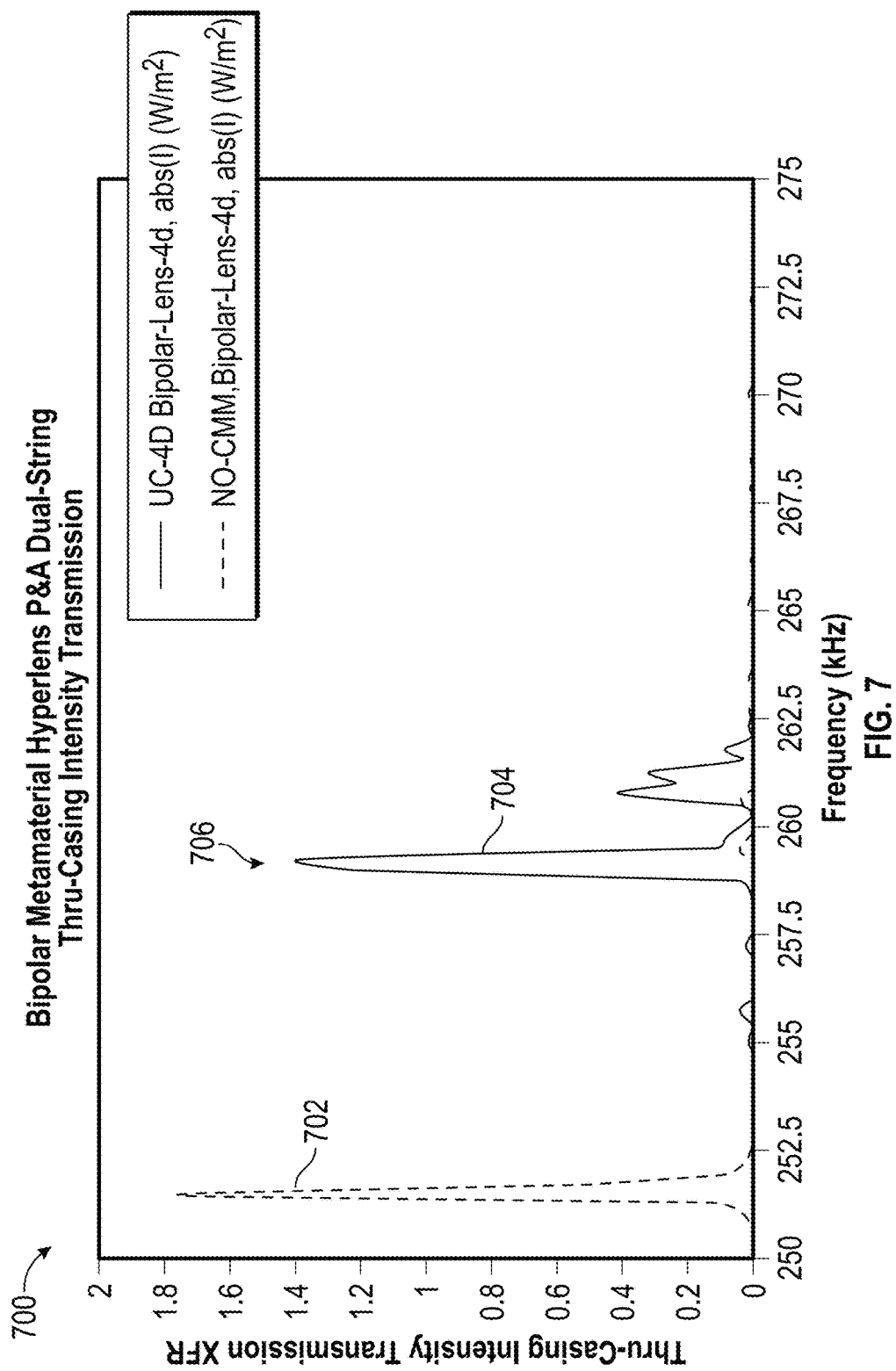
FIG. 7 shows a graphical depiction of illustrative theoretical plots of thru-casing intensity transmission.

FIG. 7 shows a graphical depiction 700 of illustrative theoretical plots of thru-casing intensity transmission. Graphical depiction 700 was derived from simulation results for the dual-string scenario with the idealized (rigid) source using finite element analysis. Line 702 illustrates the intensity of an acoustic transmission over a range of frequencies for a signal through the dual string section with one-half inch metal casing. This signal is transmitted directly into the dual string section with one-half inch casing. Line 704 illustrates the intensity of an acoustic transmission over a range of frequencies for a signal through dual string section with one-half inch metal casing. However, this signal is first manipulated by a lens as described above that has a cell with geometries as discussed above before entering the dual string section. It should be noted that the line 704 demonstrates an increased signal intensity over a relatively broad frequency range. A peak 706 may occur as shown at a particular frequency. It should be noted the simulation of the signal assembly of the present disclosure features enhanced thru-casing acoustic intensity transmission compared to the control case without the hyperlens by about +30 dB at the hyperlens design resonance of 259 kHz. It should be appreciated, that the increased signal intensity is obtained without increasing the amplitude of the voltage signal applied to the transducer.

FIGS. 8A & 8B show contour plots 800 and 850, respectively, illustrating the acoustic intensity of acoustic waves emitted by a transducer 452 in a casing 834, fixed in a borehole, that is filled by a borehole fluid 837. Contour plots 800 and 850 are derived from simulation results for the dual-string scenario with the idealized (rigid) source using multiphysics modeling. The graphs 800, 850 depict an end view or top view; i.e., along a longitudinal axis of a borehole 836. Also, for simplicity, the tool modeling is done using a symmetric half-section. The dark blue areas 860 show regions of low acoustic intensity and the dark red regions 861 show areas of high acoustic intensity. In FIG. 8A, the transducer 452 emits a signal directly into the casing 834. The acoustic intensity in the region 838 along the radial direction from the transducer has a diffuse acoustic intensity of low magnitude, which is generally considered undesirable for acoustic imaging. In FIG. 8B, the transducer 452 emits a signal through a lens 454. As can be seen, the lens 454 creates a relatively focused zone 840 of acoustic intensity along a radial direction from the transducer 452, which is generally considered desirable for acoustic imaging. Numerical modeling suggests that the acoustic intensity in the region 840 may be an order of magnitude higher than the acoustic intensity in the region 838. One can observe the nearly collimated intensity transmission through the tubulars and into the cement domain. The transmission beam width (−6 dB) is approximately 15 mm wide at the cement bond interface with the steel casing.

Figure 9:
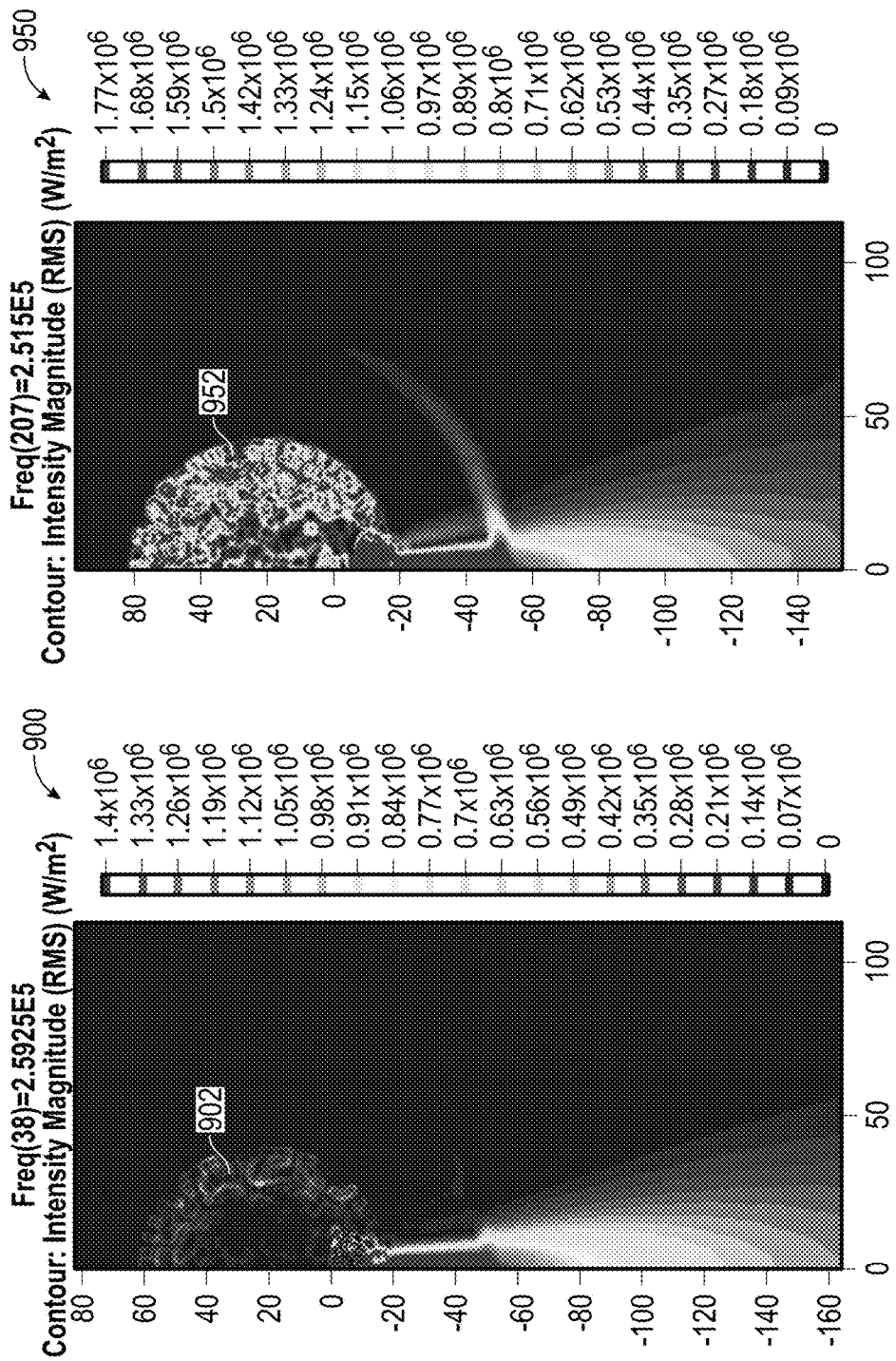
FIGS. 9A & 9B show an illustration of the comparison in resonant energy distribution with the hyperlens and without hyperlens, respectively.

FIGS. 9A & 9B show contour plots 900 and 950, respectively, illustrating the respective degree of non-productive reverberation. Graphical depictions 900 and 950 are derived from simulation results for the dual-string scenario with the idealized (rigid) source using multiphysics modeling. An important feature of the dual-string thru-casing transmission field with the bipolar hyperlens as disclosed herein is the absence of significant tubing and/or casing resonant reverberations, as indicated in the line contour plot of FIGS. 8A & 8B. The energy intensity within the tubing, casing and downhole fluid associated with the amplified transmission with the hyperlens (FIG. 8A) is of a similar magnitude as the non-resonant quiescent distribution seen in the response without the hyperlens (FIG. 8B). An illustration of the comparison in resonant energy distribution with the hyperlens and without hyperlens is shown in FIGS. 9A & 9B. The intrinsic resonant response of the dual-string section at 252 kHz without the hyperlens (FIG. 9B) has a large reverberation in the tubing and also in the casing to a slightly lesser extent (reverberating strings 952). Looking at FIG. 9A, in comparison, the resonant response of the dual-string section with the hyperlens has significantly reduced reverberation in the tubing (quiescent strings 902) and effectively zero reverberation in the casing. This quiescent phenomena associated with the hyperlens is expected to create a low noise floor compatible with pulse-echo type imaging applications which require a quiescent environment for detection of very small cement bond echo reflection signals.

Figure 10:
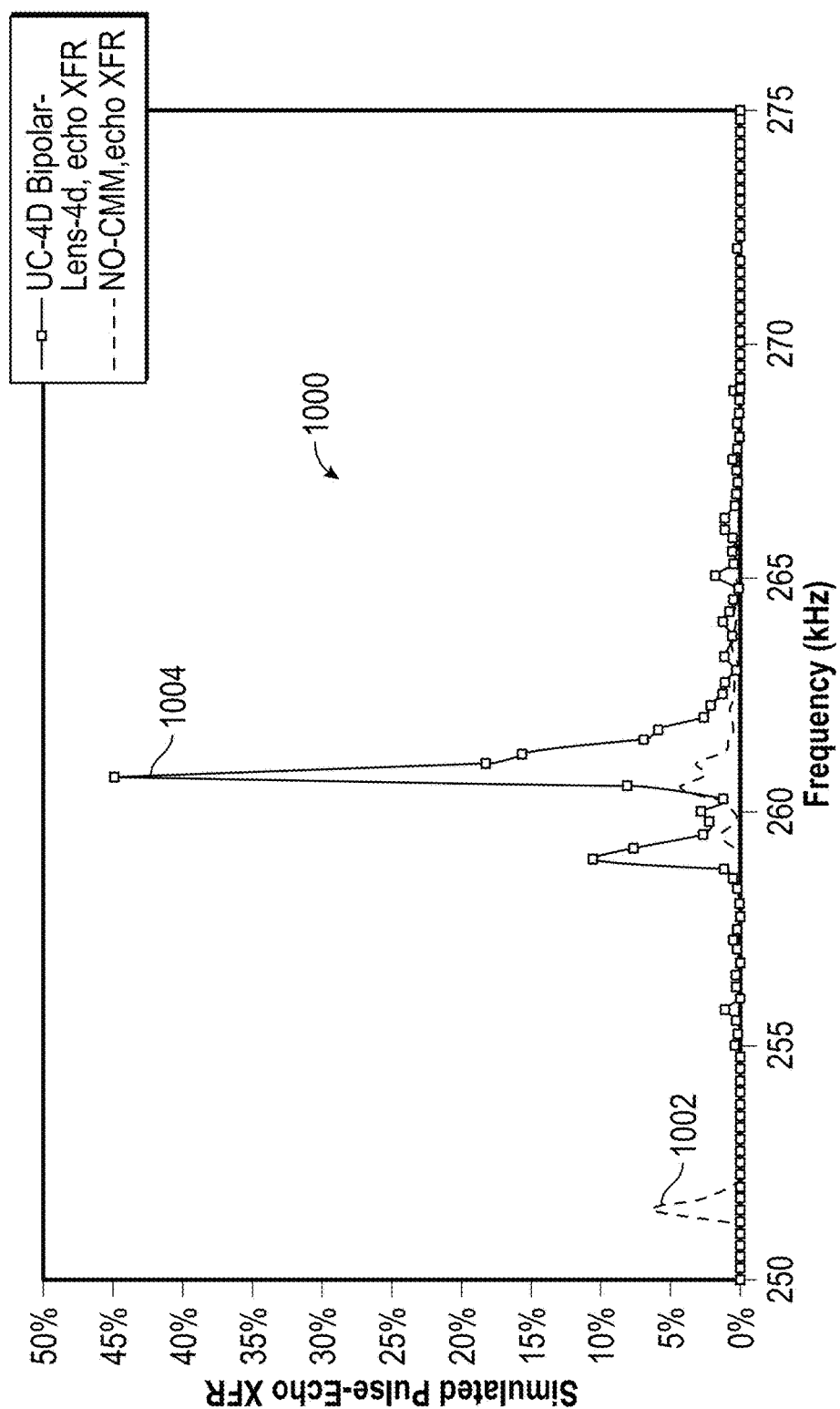
FIG. 10 shows a graphical depiction of illustrative theoretical plots of thru-casing pressure transmission for reflected waves.
Figures 11A, 11B:
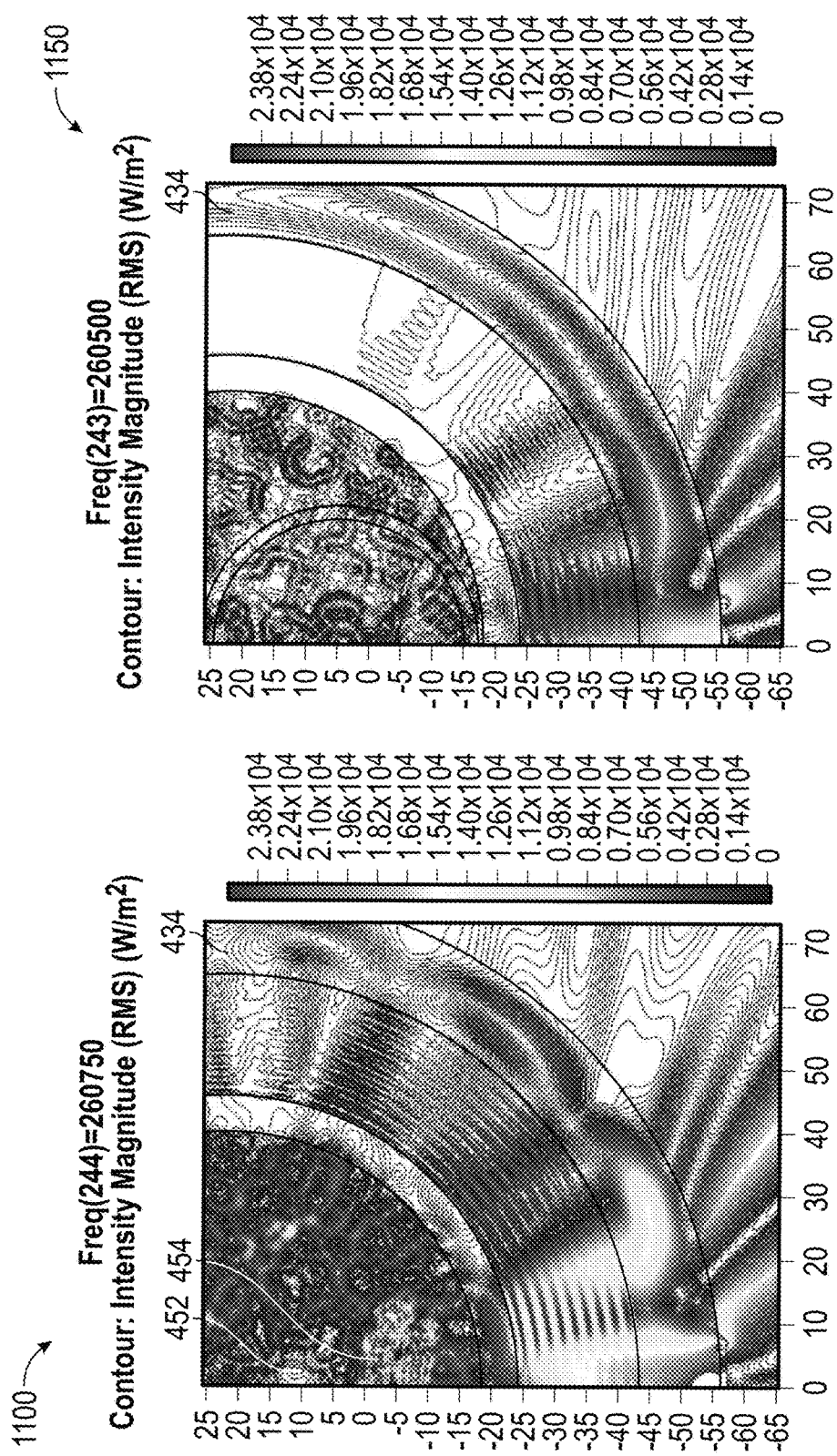
FIGS. 11A & 11B show contour plots illustrating a distribution of acoustic intensity for a received signal from an anomaly reflection at the casing-cement bond interface with the hyperlens and without hyperlens, respectively.

FIG. 10 shows a graphical depiction 1000 of illustrative theoretical plots of thru-casing pressure transmission for reflected waves. Graphical depiction 1000 was derived from a simulation similar to the finite element analysis of FIG. 6, but including a small circumferential pressure anomaly interface between the steel casing and the cement domain. FIGS. 11A & 11B show contour plots 1100 and 1150, respectively, illustrating a distribution of acoustic intensity for a received signal 1102 from an anomaly reflection at the casing-cement bond interface 464. Plot 1100 shows results with the lens assembly. Plot 1150 shows results without the lens assembly. As before, there is shown a transducer 452 in a casing 434. A pressure emitter placed in the anomaly simulates a cement bond reflection that has an arc length of 15 mm.

Implicit in this analysis is the assumption that the reflection coefficient for the interfacial anomaly is 1. A pseudo-pulse-echo transfer function is constructed by first normalizing the pressure magnitude of the interface emitter to equal that of the pressure transmission for the thru-casing simulations shown above. The average pressure magnitude that is transmitted back onto the original source boundary due to the reflection is normalized relative to the amplitude of the original ideal source, to provide a simulated (two-step) pulse-echo transfer function. Curves 1002 and 1004 illustrate the frequency response spectrum for the simulated pulse-echo transfer function. The pulse-echo transfer function for the dual-string without the lens assembly (curve 1002) indicates that the high transmission at the intrinsic dual-string resonance of 252 kHz does not reciprocate proportionately for the reflection back onto the source boundary, with a 6.6% net fraction of the original source pressure received. In contrast the second hyperlens resonance at 261 kHz for curve 1004 displays excellent reciprocity for the reflection emitter, with a 45.7% net fraction of the original source pressure received.

While the present disclosure is discussed in the context of a hydrocarbon producing well, it should be understood that the present disclosure may be used in any borehole environment (e.g., a water or geothermal well). Also, embodiments may be used in acoustic tools used at the surface or in bodies or water.

"Curvilinear array," as used herein, means the cells of the array are arranged along curved lines on a surface to which the cells are connected, as opposed to a rectangular grid of cells.

"Conformal mapping geometry," as used herein, refers to a geometry of cell placement at intersections of contour lines from a non-Cartesian coordinate system mapped onto a surface. Herein the surface may be a flat base from which each cell projects in a cantilever fashion.

"Bipolar," as used herein, relates to an orthogonal coordinate system of two dimensions. "Canonical bipolar" relates to a bipolar coordinate system based on Apollonian circles in which curves of constant u and v are circles that intersect at right angles, wherein the coordinates have two foci F1 and F2, which may be mapped at (−R, 0) and (R, 0), respectively, on the x-axis of a Cartesian coordinate system.

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

I claim:

1. An apparatus for investigating a subsurface volume of interest from a borehole, comprising:
    an enclosure configured for conveyance along the borehole;
    an acoustic source in the enclosure configured to generate acoustic signals;
    a lens assembly disposed in the enclosure and next to the acoustic source, the lens assembly being formed of a plurality of lens elements;
    wherein each lens element comprises a plurality of cells arranged in a curvilinear cell array, each cell formed as a column oriented transverse to a direction of travel of the acoustical signals, each cell having a hub, a plurality of spokes radiating from the hub, and a plurality of fingers circumferentially distributed around the hub, wherein the hub, spokes, and fingers are oriented to cause the acoustic waves to travel at a different speed in each of three orthogonal directions.

2. The apparatus of claim 1, wherein the hub is formed of a plurality of structurally independent sections, wherein each section has a set of the plurality of spokes, and wherein each set of the plurality of spokes are structurally independent to one another.

3. The apparatus of claim 1, wherein:
    the hub, the plurality of spokes, and the plurality of fingers are divided to form a plurality of structurally independent cell segments;
    the plurality of fingers are radially staggered to nest between one another; and
    the hub, the plurality of spokes, and the plurality of fingers all lie along the same plane.

4. The apparatus of claim 1, further comprising a rotary device rotating the enclosure.

5. The apparatus of claim 1, wherein a metamaterial created by the plurality of cells deforms with a different bulk moduli in each of the three orthogonal directions.

6. The apparatus of claim 1, wherein the plurality of cells are arranged according to a conformal mapping geometry.

7. The apparatus of claim 6, wherein the conformal mapping geometry comprises a canonical Bipolar conformal mapping transformation of constant [u,v] contour lines to [x,y] Cartesian coordinates.

8. The apparatus of claim 7, wherein the rectangular [x,y] Cartesian coordinates may be related to the [u,v] contour lines by the relations:

$$x = R\left[\frac{\sinh(u)}{\cosh(u)-\cos(v)}\right], y = R\left[\frac{\sin(v)}{\cosh(u)-\cos(v)}\right].$$

9. The apparatus of claim 7, wherein a portion of the plurality of cells are each scaled down in size by a scale factor from a largest cell dimension applicable to at least one cell of the plurality to fit within the conformal mapping.

10. The apparatus of claim 9, wherein the scale factor corresponding to each cell of the portion varies non-monotonically along periodicity lines of the conformal mapping.

11. A method for investigating a subsurface volume of interest, comprising:
    positioning an acoustic tool in a wellbore, the acoustic tool including:
        an enclosure configured for conveyance along the borehole;
        an acoustic source in the enclosure configured to generate acoustic signals;
        a lens assembly disposed in the enclosure and next to the acoustic source, the lens assembly being formed of a plurality of lens elements;
        wherein each lens element comprises a plurality of cells arranged in a curvilinear cell array, each cell formed as a column oriented transverse to a direction of travel of the acoustical signals, each cell having a hub, a plurality of spokes radiating from the hub, and a plurality of fingers circumferentially distributed around the hub, wherein the hub, spokes, and fingers are oriented to cause the acoustic waves to travel at a different speed in each of three orthogonal directions; and
    directing the acoustic waves through an adjacent aberrating media that at least partially blocks the direction of travel of the acoustic waves to the volume of interest.

12. The method of claim 11, further comprising rotating the acoustic tool.

13. The method of claim 11, further comprising using the acoustic transducer to detect a reflected signal from the volume of interest that has travelled through the aberrating media and the lens assembly.

14. The method of claim 11, further comprising:
receiving an acoustic signal responsive to the acoustic waves comprising information relating to the volume of interest; and
using the information to estimate a parameter of interest.

15. The method of claim 14, further comprising using the estimated parameter of interest to perform further borehole operations.

16. The method of claim 11, wherein the aberrating media is a metal tubular.

17. The method of claim 16, wherein the volume of interest comprises cement.

18. The method of claim 17, further comprising estimating quality of a cement bond between the cement and the metal tubular.

* * * * *